(12) United States Patent
Inglese et al.

(10) Patent No.: US 12,465,468 B2
(45) Date of Patent: Nov. 11, 2025

(54) ULTRASONIC PROBE FOR INTRAORAL SOFT TISSUE IMAGING

(71) Applicant: Carestream Dental Technology Topco Limited, London (GB)

(72) Inventors: Jean-Marc Inglese, Bussy-Saint-Georges (FR); Dominique Biava, Croissy-Beaubourg (FR); Jean-René Jacquet, Croissy-Beaubourg (FR); Victor C. Wong, Pittsford, NY (US); Jean-Marc Gregoire, Mettray (FR); Franck Levassort, Saint-Avertin (FR); Frédéric Ossant, Tours (FR)

( * ) Notice: Subject to any disclaimer, the term of this patent is extended or adjusted under 35 U.S.C. 154(b) by 1665 days.

(21) Appl. No.: 16/486,457

(22) PCT Filed: Feb. 15, 2018

(86) PCT No.: PCT/EP2018/053847
§ 371 (c)(1),
(2) Date: Aug. 15, 2019

(87) PCT Pub. No.: WO2018/149948
PCT Pub. Date: Aug. 23, 2018

(65) Prior Publication Data
US 2024/0268937 A1 Aug. 15, 2024

Related U.S. Application Data

(60) Provisional application No. 62/459,250, filed on Feb. 15, 2017.

(51) Int. Cl.
*A61C 9/00* (2006.01)
*A61B 8/00* (2006.01)
*A61B 8/12* (2006.01)

(52) U.S. Cl.
CPC ............ *A61C 9/0086* (2013.01); *A61B 8/12* (2013.01); *A61B 8/4411* (2013.01); *A61B 8/4444* (2013.01); *A61B 8/483* (2013.01)

(58) Field of Classification Search
None
See application file for complete search history.

(56) References Cited

U.S. PATENT DOCUMENTS

| 2006/0281044 | A1* | 12/2006 | Case ............ A61C 19/043 433/72 |
| 2009/0306506 | A1* | 12/2009 | Heger ............ A61C 9/0086 600/443 |
| 2013/0060144 | A1* | 3/2013 | Culjat ............ A61B 8/14 600/459 |
| 2014/0275986 | A1* | 9/2014 | Vertikov ............ A61B 5/062 600/424 |

* cited by examiner

*Primary Examiner* — Rebecca A Volentine

(57) ABSTRACT

Certain exemplary ultrasound probe method and/or apparatus embodiments are described, which can be used for 2D and/or 3D imaging soft tissue in an intra oral cavity.

18 Claims, 8 Drawing Sheets

ULTRASONIC PROBE FOR INTRAORAL
// SOFT TISSUE IMAGING

FIELD OF THE INVENTION

The present invention is related to the field of dentistry and in particular to the application of ultrasonic technology for imaging soft tissues in an oral cavity.

BACKGROUND OF THE INVENTION

The oral pathology diagnostic of soft tissue is today essentially based on visual inspection or palpation. The practitioner will therefore have access to partial information on the lesion property and its dimensions. Periodontal gum disease is also part of the oral pathology that remains difficult to detect at an earlier stage with the available tools.

Periodontal gum disease is a serious infection of the mouth that, if left untreated, can lead to tooth loss and has been associated with, and is suspected of contributing to heart attacks, strokes, diabetes, respiratory diseases, premature/underweight babies and even death.

Periodontal disease can affect one tooth or many teeth. It begins when the bacteria in plaque (the sticky, colorless film that constantly forms on everyone's teeth) causes the gums to become infected and inflamed.

In the mildest form of the disease, gingivitis, the gums redden, swell and bleed easily. There is usually little or no discomfort. Gingivitis is often caused by inadequate oral hygiene, especially lack of flossing. Gingivitis is reversible with professional treatment and good oral home care.

Untreated gingivitis can advance to periodontitis. With time, plaque can harden into calculus and spread and grow below the gum line where it can become a breeding ground for bacteria below the gum line. Toxins produced by the bacteria in plaque and calculus continue to irritate and inflame the gums and surrounding tissue. As the infection becomes more severe, the toxins stimulate a chronic inflammatory response in which the body in essence turns on itself and the tissues (ligaments) and bone that support the teeth are broken down and destroyed.

Periodontal soft tissue (e.g., gums or gingiva and the periodontal ligament) detach from the teeth, forming periodontal pockets (spaces between the teeth and periodontal tissue) that become infected. As the disease progresses, more and more destructive toxins are produced and as a result, the periodontal pockets deepen and more periodontal tissue and bone are broken down and destroyed. Initially this destructive process may be asymptomatic. Eventually, teeth can become loose and may be lost or have to be removed. More than 300 different types of bacteria can exist in the human mouth, either alone or in combination. This makes treating periodontal disease difficult, time consuming and expensive as the periodontist tries various antibiotics and treatment modalities until an effective treatment plan is developed. Like any other serious infection, if not promptly treated with the proper types and amounts of antibiotics, periodontitis can result in severe systemic infection that can lead to many other serious diseases and even become life-threatening. As the patient's immune system fights this chronic and perhaps serious infection, it can create an opportunity for other serious diseases, such as heart disease, stroke and diabetes, to develop. The current methodology used by dentists and dental hygienists to detect and measure periodontal pocket depth consists of a sharp metal probe that is inserted between the tooth and gum and which is manually pressed down until it encounters resistance of the ligament. The depth to the ligament is thereby measured and indicates the amount of clinical attachment lost (loss of ligament), which can be an indication of the amount of periodontal disease that may be present. This method is often painful for the patient, and is invasive, bloody, inaccurate and/or subjective. It is especially inaccurate and subjective because of the difficultly in applying the same amount of force with each measurement, resulting in high intra-examiner and inter-examiner variation in measurement. The difficulty is increased because the examiner does not know the type of tissue present below the gum line and if the probe is touching or piercing this tissue. Additionally, exposure to the patient's blood by dental professionals increases risk of exposure to hepatitis, HIV and other infectious diseases.

Further, the current methodology is limited in its effectiveness as a tool for diagnosing periodontal disease in its earliest stages as it is a retrospective analysis and can only measure significant amounts of tissue already lost. In addition, this method typically calls for two people to perform this test, an examiner who actually makes the measurements and a scribe who usually writes down the measurements by hand. The examiner is generally a dental health professional, such as a dentist, dental hygienist or periodontist. The scribe may also be a dental health professional but may also be a lesser skilled individual such as an office assistant. Another problem facing dentists is the difficulty in determining long term trends of the patients' condition because all of the information is contained in numerous paper (i.e., analog) records that usually span many years. As a result, usually only the last one or two records are reviewed for comparison with the current test results and these may not be sufficient to accurately reflect a very gradual deterioration of the patient's periodontal condition.

An additional problem with the existing manual probe methodology is that it is typically can be disruptive to the healing process. The trial and error approach can tear newly healed tissue and can cause recovery to be extended for weeks or months. Further, it can allow bacteria into the wound and the patient's blood stream, which can lead to infection. This makes treating periodontal disease difficult, time consuming and/or expensive as the periodontist tries various antibiotics and treatment modalities until an effective treatment plan is developed.

FIG. 1 is a schematic diagram comparing a healthy tooth 000 on the left and a tooth 006 with periodontal disease on the right. The healthy tooth 000 has a full, healthy bone level 004, healthy periodontal ligament 003, and a healthy gum/gingiva 002. The diseased tooth 006 exhibits gum/gingiva loss 016, loss of periodontal ligament attachment (clinical attachment loss) 015 and resorption of avelor bone level 014, resulting in the formation of a periodontal pocket 012. The diseased tooth 006 also exhibits a build up of plaque 008 and tartar/calculus 010. If the periodontal condition is not diagnosed and corrected, the diseased tooth 006 may be lost or have to be removed.

In WO2006/105476, a system for detecting and measuring attachment loss using ultrasounds is described. However it does not provide 2D or 3D images in real time.

Therefore, there is a need for providing a novel ultrasound probe member configuration.

It is an object of the invention to provide a probe member intended to be used for 2D and/or 3D imaging a soft tissue in an intra oral cavity, comprising:

a. an acoustic window intended to face the soft tissue to be imaged;

b. an ultrasound transducer system configured for:
  emitting an ultrasound signal in the form of a beam through the acoustic window along at least one axis;
  receiving a corresponding ultrasound return signal through the acoustic window;
c. a beam forming and scanning assembly configured for driving the ultrasound beam axis through the acoustic window;
d. the ultrasound transducer system operating at a center frequency fo in the range of [10 MHz; 100 Mhz].

The probe member is more particularly a dental probe member that is intended to be used for dental imaging applications.

According to other possible features:
- the ultrasound transducer system more particularly operates at a center frequency fo in the range of [10 MHz; 50 Mhz];
- the ultrasound beam has a width lying in the range [2λ; 5λ] in the zone to be imaged, where λ is the wavelength of the ultrasound signal in a propagation medium;
- the beam forming and scanning assembly is further configured for increasing the depth of field of the ultrasound beam;
- the ultrasound transducer system is further configured for generating a focused ultrasound beam;
- the ultrasound transducer system comprises at least one transducer;
- the at least one transducer has a front face that is exposed to a coupling medium;
- the at least one transducer is accommodated in a casing;
- the at least one transducer is located at a distance from the acoustic window;
- the probe member has an outside contact zone that is intended to be in contact with the soft tissue to be imaged and the at least one transducer has a front face that is located at a distance of at least 2 mm from said outside contact zone;
- the acoustic window is open;
- the acoustic window is closed;
- the acoustic window is closed with an acoustic membrane;
- the membrane is a semipermeable acoustic membrane;
- the membrane is a conformable acoustic membrane;
- the probe member comprises a coupling material, for example a coupling gel, between the at least one transducer and the closed acoustic window;
- the beam forming and scanning assembly is accommodated in a casing;
- the at least one transducer is of the following type: mono-element transducer, multi-element annular transducer, 1D array transducer, 2D array transducer;
- the at least one transducer is more particularly of the following type: focused mono-element transducer, unfocused mono-element transducer, focused multi-element annular transducer, unfocused multi-element annular transducer;
- the at least one transducer is one among a capacitive micromachined Ultrasound transducer (CMUT); a polyvinylidene fluoride-trifluoroethylene transducer (PVDF-TrFE), a piezoelectric ceramic transducer (PZT, $LiNbO_3$), or electrostatic transducer;
- the probe member may be such that:
  - the transducer focal distance is less than or equal to 20 mm, preferably less than 15 mm, and/or
  - the transducer depth of field is greater than or equal to 2 mm, preferably greater than or equal to 5 mm;
- the at least one transducer is associated with an acoustic reflector;
- the at least one transducer and the acoustic reflector associated therewith are accommodated in a casing containing a coupling medium;
- the beam forming assembly is configured for driving mechanically and/or electronically the ultrasound beam axis through the acoustic window;
- the beam forming and scanning assembly is configured for oscillating the ultrasound beam axis along one or two axis;
- the probe member comprises at least one actuator configured for oscillating the acoustic reflector;
- the acoustic reflector is of a focused or unfocused type;
- the beam forming and scanning assembly is configured for oscillating the at least one transducer along one or two axis;
- the probe member comprises at least one actuator configured for oscillating the at least one transducer;
- the actuator is in a coupling medium;
- the actuator is accommodated in a casing;
- the at least one actuator is of one of the following type: mechanical, electromechanical, pneumatic, hydraulic, electric, thermal, shape memory;
- the probe member comprises a casing accommodating the ultrasound transducer system;
- the casing contains a coupling medium that is interposed between the ultrasound transducer system and the acoustic window;
- the probe member comprises an outside conformable material portion that is suitable for being conformed to an area of the soft tissue to be imaged;
- the outside conformable material portion is located around the acoustic window;
- the outside conformable material portion externally surrounds an area that is at least partly located in front of the acoustic window;
- the outside conformable material portion is a conformable gasket;
- the probe member comprises a coupling medium circulation circuitry configured for providing a coupling medium in an area located outside the probe member and facing the acoustic window;
- the coupling medium circulation circuitry comprises an outlet that is located between the outside conformable material portion and the acoustic window so that coupling medium be introduced directly into the area facing the acoustic window and surrounded by the outside conformable material portion;
- the probe member further comprises a nozzle configured to introduce coupling medium between the outside conformable material portion and the acoustic window;
- the probe member comprises a temperature measurement assembly for measuring the temperature of the coupling medium;
- the probe member comprises a pressure measurement assembly for measuring the pressure of the coupling medium;
- the probe member comprises a flow metering assembly for measuring the flow rate of the coupling medium;
- the coupling medium is bubble-free;
- the coupling medium is a biocompatible liquid.

It is another object to provide a probe (ex: a dental probe) intended to be used for 2D and/or 3D imaging a soft tissue in an intra oral cavity, comprising a probe member as briefly discussed above.

According to other possible features:

the connector comprises electrical terminals and coupling medium inlet/outlet.

the probe comprises a rapid connect/disconnect connector that comprises electrical terminals and coupling medium inlet/outlet.

the rapid connect/disconnect connector is suitable for connecting/disconnecting the probe body to a hose or the probe body to the probe head.

the coupling medium is water.

the probe further comprises an air inlet/outlet.

the probe head comprises:
  a first probe head part that is a rigid part or a deformable part that can be deformed by bending, and
  a second probe head part that comprises the acoustic window.

the second probe head part is suitable for taking several angular orientations.

the probe head is separable from the probe body.

the probe head comprises a probe head cover covering a probe head part that is connected to the probe body and a removable probe head shell that comprises the closed acoustic window.

the probe head shell comprises a coupling medium outlet located adjacent to the closed acoustic window so as to introduce coupling medium into an area facing the closed acoustic window.

the coupling medium outlet is a nozzle.

the probe comprises a coupling medium circuitry that is external to the probe head part and connected to the probe body.

the coupling medium circuitry is at least partially covered by the probe head cover.

the coupling medium circuitry is a hose or the like.

the probe further comprises a rapid connect/disconnect connector for connecting/disconnecting the coupling medium circuitry and the probe body.

the closed acoustic window is a semipermeable acoustic membrane that allows coupling medium to outflow from the probe head shell and prevents the contaminated coupling medium from entering into the latter.

the probe further comprises a reconstructing unit configured for providing a digital image signal based on the ultrasound return signal.

the probe further comprises a transmitting unit for transmitting the digital image signal.

the probe further comprises a transmitting unit for transmitting the ultrasound return signal and/or control information.

the transmission is wireless.

the probe further comprises a receiving unit for receiving control information intended to modify operating parameters of the probe.

the probe further comprises the following electronics components adjacent to or inside at least one ultrasound transducer of the ultrasound transducer system:
  a. a low noise amplifier;
  b. a variable gain amplifier; and
  c. an anti-aliasing filter.

the probe further comprises at least one analog to digital converter to digitize the ultrasound return signal.

the probe further comprises a multiplexer.

at least some of the electronics components are integrated within at least one ultrasound transducer of the ultrasound transducer system.

the beam forming and scanning assembly of the probe comprises at least one actuator configured for oscillating a component of the ultrasound transducer system along one or two axis.

the probe further comprises a processing unit configured for controlling the at least one actuator.

It is still another object to provide a method for 2D and/or 3D imaging a soft tissue in an intra oral cavity, the method comprising:
  providing a probe member as briefly discussed above or a probe as briefly discussed above;
  installing the probe member or probe on a dentist equipment;
  supplying the probe member or probe with a coupling medium;
  dispensing the coupling medium between the acoustic window and the soft tissue to be imaged.

According to other possible features:

the installation of the probe member or probe on a dentist equipment comprises plugging the probe member or probe on a dentist unit cord.

the coupling medium is supplied by a dentist chair.

the coupling medium is water.

the coupling medium is dispensed with a flow rate.

the flow rate of the coupling medium is controlled by at least one of the following: a pedal, an aspirating unit for aspirating liquid in a patient's mouth, a triggering member, preferably a button, image triggering.

the coupling medium is continuously dispensed in an area between the acoustic window and the soft tissue to be imaged so as to keep the area free from air when the probe member or probe is applied against the soft tissue to be imaged.

According to yet another object, there is provided a method for operating a probe member for 2D and/or 3D imaging a soft tissue in an intra oral cavity, comprising:
  emitting an ultrasound signal in the form of a beam at a center frequency fo in the range of [10 MHz; 100 Mhz];
  driving the ultrasound beam signal through the acoustic window along at least one axis;
  receiving a corresponding ultrasound return signal through the acoustic window.

According to other possible features:

driving the ultrasound beam signal through the acoustic window along at least one axis is performed mechanically and/or electronically.

driving the ultrasound beam signal through the acoustic window along at least one axis more particularly comprises oscillating the ultrasound beam axis along at least one axis.

the probe member is manually or automatically moved for 2D and/or 3D imaging a greater portion of the soft tissue.

the method further comprises determining the spatial location of the probe member.

spatially locating the probe member is performed using an accelerometer.

the method further comprises reconstructing a 2D and/or a 3D digital image signal based on driving the ultrasound beam signal and manually moving the probe member.

the method further comprises providing a digital image signal based on the ultrasound return signal.

the method further comprises transmitting the digital image signal.

the method further comprises transmitting the ultrasound return signal and/or control information or receiving control information for modifying operating parameters of the probe member.

transmission is wireless.

the probe member is as briefly described above.

the probe member has a front tip that is suitable to be curved during operation of the probe member.

Other features and advantages will emerge from the following description that is provided by way of non-limiting and illustrative example only with reference to the following drawings.

Figure 1:
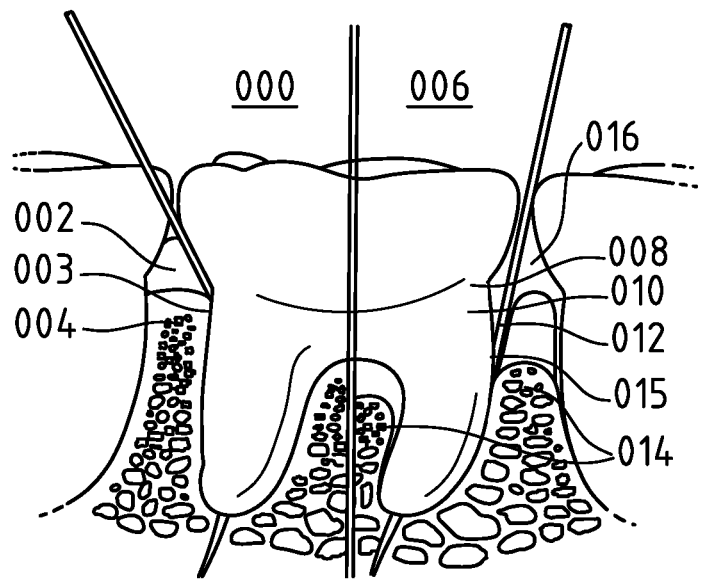
FIG. 1 is a schematic representation comparing on the same drawing a healthy tooth on the left and an unhealthy tooth on the right.
Figure 2:
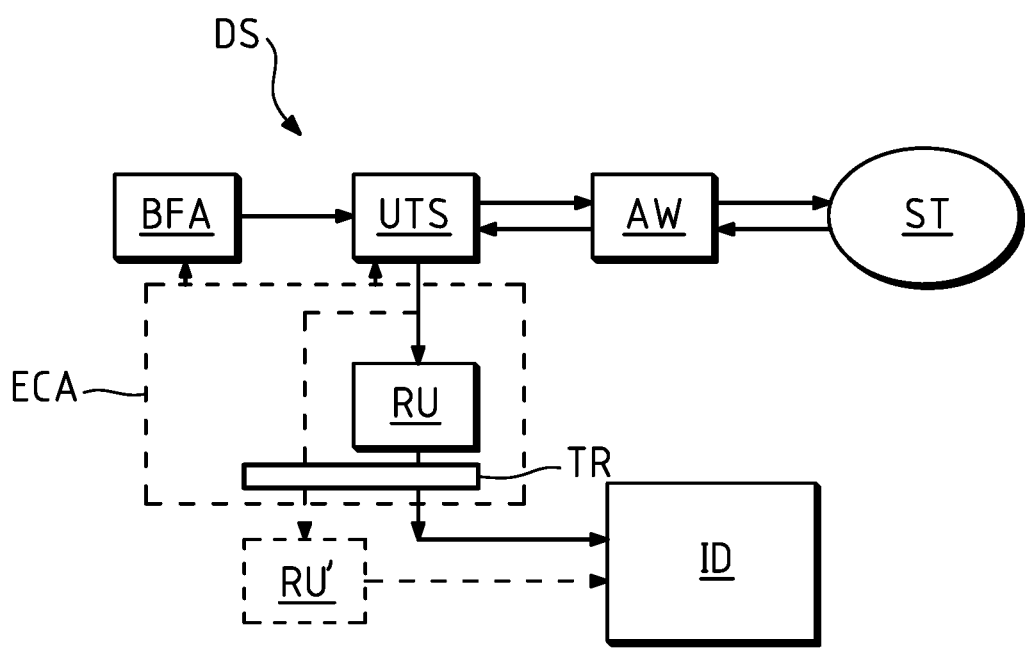
FIG. 2 is a very schematic view illustrating components of a dental system according to an embodiment of the invention.

As represented in FIG. 2, a dental system DS according to an embodiment of the invention is intended to be used for 2D and/or 3D imaging a soft tissue ST in an intra oral cavity, i.e. the mouth of a patient. Such a system uses ultrasound beams for obtaining echographic images of the intra oral cavity.

Dental system DS mainly comprises:
an acoustic window AW intended to face the soft tissue ST to be imaged;
an ultrasound transducer system UTS configured for:
emitting an ultrasound signal in the form of a beam through the acoustic window along at least one axis;
receiving a corresponding ultrasound return signal through the acoustic window;
a beam forming and scanning assembly BFA configured for driving the ultrasound beam axis through the acoustic window.

The above acoustic window AW, the ultrasound transducer system UTS and the beam forming and scanning assembly BFA may be part of a dental probe member and, more generally, of a dental probe that is intended to be used for 2D and/or 3D imaging a soft tissue ST in an intra oral cavity. Such a probe may comprise a probe body and a probe head and the above probe member is the probe head.

The probe head is intended to be fixed, attached or fastened to a probe body by conventional mechanical fixations, mechanical attaching or fastening members etc.

As will be seen subsequently, the acoustic window AW, the ultrasound transducer system UTS and the beam forming and scanning assembly BFA may each assume several configurations and/or perform functions according to specific operational modes. These possible configurations for each of the above components may be combined together. Likewise, these possible specific operational modes for each of the above components may be combined together in addition or not to the above possible configuration combinations.

In an embodiment, the beam forming and scanning assembly BFA may comprise:
a component or sub-assembly that is configured for forming the ultrasound beam, and/or
a component or sub-assembly that is configured for scanning the ultrasound beam (sweeping mode).

In an embodiment, the beam forming and scanning assembly BFA may be configured for focusing the ultrasound beam. At the emission, beam forming may include, for a multi element transducer (ex: multi annular, 1D array, 2D array etc.), applying electronic delays to the different transducer elements.

To be noted that beam forming may also be used in reception (on the received signal(s)). For example, beam forming in reception may include focusing. This may be the case for a multi element transducer (ex: multi annular, 1D array, 2D array etc.). In such a case focusing at the emission may not be necessary.

According to several possible first embodiments:
the acoustic window AW may be open or closed; and/or
the ultrasound transducer system UTS may comprise one or more ultrasound transducers (of a focused or unfocused type) associated or not with an acoustic reflector (of a focused or unfocused type); and/or
the beam forming and scanning assembly BFA may be configured for driving mechanically and/or electronically (sweeping mode) the ultrasound beam axis through the acoustic window, in particular for oscillating the ultrasound beam axis along one or two axis.

According to further possible embodiments depending on the above first embodiments:
the acoustic window AW may be closed with an acoustic membrane which can be, e.g. a semipermeable acoustic membrane, a conformable acoustic membrane that is suitable for conforming the outside shape of the dental zone to be imaged (in case of periodontal use, the conformable acoustic membrane must be suitable for enabling comfort for the patient when scanning the lingual side and/or the facial side of the soft tissue); and/or
the beam forming and scanning assembly BFA may be configured either for oscillating the at least one transducer along one or two axis or for oscillating the acoustic reflector (sweeping mode); by way of example beam forming and scanning assembly BFA may comprise at least one actuator configured for imparting oscillations to either the at least one transducer or the acoustic reflector.

More particularly, the ultrasound transducer system UTS of FIG. 2 is configured to operate at a center frequency fo in the range of [10 MHz; 100 Mhz].

Selecting a high frequency (between 10 and 100 MHz) for operating the ultrasound transducer system UTS makes it possible to achieve a high spatial resolution (high accuracy), in particular axial resolution, in the image obtained from the ultrasound return signal. The axial resolution is defined by the minimum distance between two objects along an axis z of the ultrasound beam (axis of propagation of the beam). This axis corresponds to the z axis of the beam that extends from the ultrasound transducer system towards to the zone to be imaged through the acoustic window. To be noted that the image generated by the probe member may be of a rectangular shape (the axis of the beam is perpendicular to the acoustic window) or sectorial shape (the axis of the beam is perpendicular to the middle of the sector).

Spatial resolution also lateral resolution that takes place in the x,y directions perpendicular to z axis.

Preferably, in order to achieve a higher spatial, in particular axial, resolution for the dental system (or probe member) a bandwidth of at least 50%, preferably 70%, of the center frequency fo (generally with an attenuation of 6 dB) can be used.

When the bandwidth is wide enough several frequencies can be selected for emitting ultrasound beams and the emitting frequency can be adapted to a specific use and/or type of tissue to be imaged.

Thus, by way of example, if fo equals 20 MHz, a bandwidth of 70% equals 14 MHz, which sets a minimum frequency of 13 MHz and a maximum frequency of 27 MHz.

In a preferred embodiment, the ultrasound transducer system UTS of FIG. 2 is configured to operate at a center frequency fo in a reduced range of [10 MHz; 50 Mhz] possibly with a bandwidth of at least 70% of the center frequency fo.

Selecting the center frequency within this reduced range enables achievement of a satisfactory compromise between the resolution and the penetration depth limited by attenuation of the beam which increases with frequency.

More particularly, the center frequency may be selected in a further reduced range of [20 MHz; 40 Mhz], which proves to be efficient for imaging dental soft tissues with high accuracy (resolution) and for a maximum penetration depth around 15 mm.

In a general manner, the practitioner may select the center frequency fo to get the best compromise between the resolution, the depth of field and the penetration depth of the beam. The practitioner may also select the center frequency according to the kind of soft tissue to be imaged. The operating center frequency can be set electronically.

Alternatively, when the above acoustic window AW, the ultrasound transducer system UTS and the beam forming and scanning assembly BFA are part of a dental probe head, the operating center frequency can be set by changing the probe head suitable for operating at the desired center frequency. Thus, several probe heads may be available for the practitioner each being operative at different frequencies. As the probe head may be removably attached, fastened, plugged etc. to the probe body, changing the probe head for selecting an adapted frequency is a particularly easy task for the practitioner. In addition to the frequency change or instead of the latter several probe heads each with a different shape may also be available for the practitioner. The different shapes are intended each to adapt to different anatomical structures to be observed/imaged.

An ultrasound beam emitted by the above ultrasound transducer system propagates towards a soft tissue to be observed/imaged (zone or region of interest which can be a portion of a soft tissue) along an axis that substantially corresponds to a line extending over a given depth of the tissue (depending on the characteristics of the beam). The ultrasound return signal that is received by the ultrasound transducer system provides image data corresponding to the line followed by the propagating signal.

In order to image a spatially extended area or zone of interest of the soft tissue, scanning or sweeping of the beam in a direction that is different than that of the axis of the beam (propagation axis for the beam), e.g. perpendicular thereto, is performed, which gives rise to a plurality of observation lines.

All the data collected from these scanned observation lines make it possible to subsequently reconstruct a 2D or 3D image of the area or zone of interest through processing of received data (ultrasound return signals).

Figure 3:
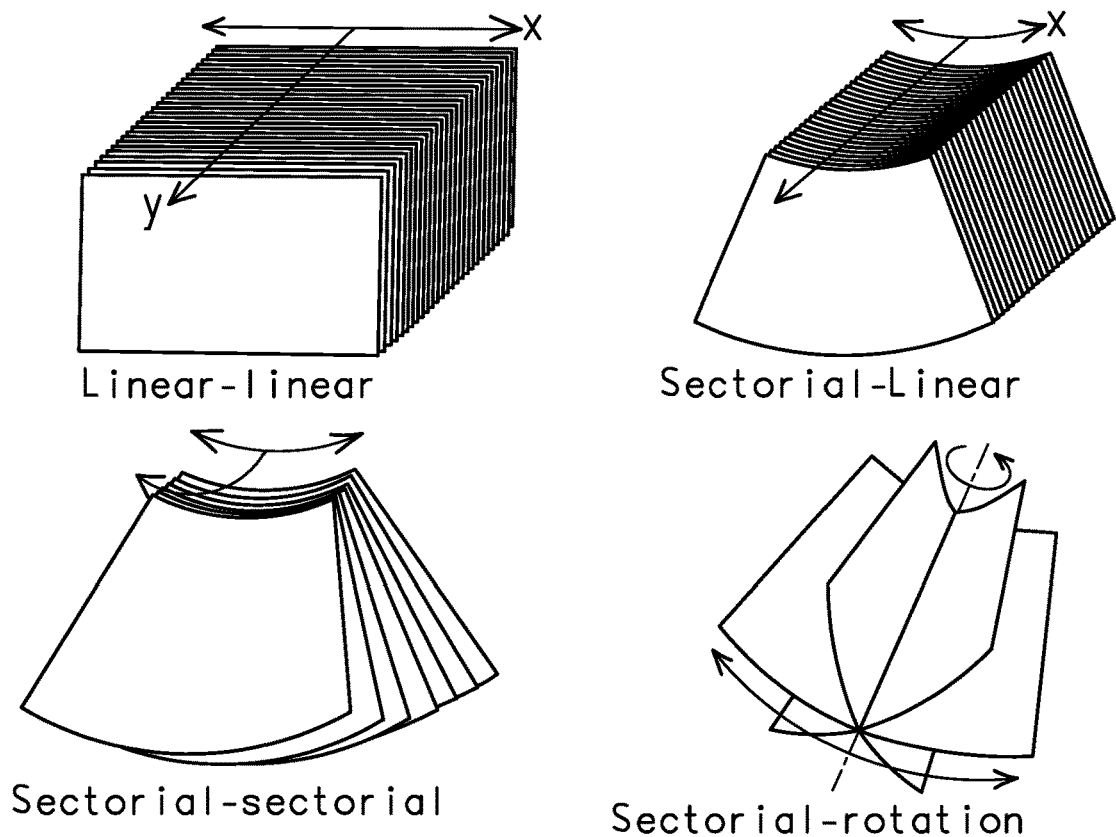
FIG. 3 illustrates different scanning modes for 3D imaging.

The reconstructed image is a 2D representation of the slice into the zone of interest. 3D images can be generated by acquiring a series of adjacent 2D images as illustrated in FIG. 3 through different scanning patterns or modes.

To be noted that the beam forming and scanning assembly, e.g. the beam scanning component or sub-assembly for driving the ultrasound beam axis through the acoustic window, allows to scan at least one part of the zone of interest for a given probe member position. The user can therefore focus his/her attention on the orientation of the probe member relative to the soft tissue to be imaged.

The thinner the ultrasound emitting beam, the higher the lateral resolution of the image.

The lateral resolution is defined by the minimum distance between two objects located on the scanning or sweeping axis of the beam, i.e. an axis that is different than that of the axis of the beam, sometimes perpendicular thereto, that traverses the acoustic window.

As briefly mentioned above, the beam forming and scanning assembly BFA may comprise a component or sub-assembly that is configured for forming an ultrasound beam and here, more particularly; a thin or narrow ultrasound beam.

In the present embodiment the ultrasound beam may have a width lying in the range $[2\lambda; 5\lambda]$, where $\lambda$ is the wavelength of the ultrasound signal in the propagation medium.

Such a width contributes to high lateral resolution.

Generally, the width of the ultrasound beam should have such a value in the exploration zone (in the soft tissue) and, more particularly, at the focal point or around the focal point, for example in the case of a multi-element annular transducer.

By way of example, the width of the beam at this location may be between 150 and 200 µm at 20 MHz.

However, another aspect may be taken into account to achieve high lateral resolution: the ultrasound beam may be focused and the ultrasound transducer system may therefore be configured for generating a focused ultrasound beam.

Focusing the beam may take several ways:

focusing may be of the geometric type: the ultrasound transducer or transducers in the ultrasound transducer system may be given a concave or hemispherical shape the radius of which defines the focus distance, so as to focus on a point;

focusing may also be performed thanks to an acoustic reflector which reflects the unfocused beam towards another direction while focusing it (the acoustic reflector may be concave);

focusing may also be of the electronic type: such focusing applies generally to 1D array and 2D array transducers, and to multi-element annular transducers. All the transducer elements in the array are excited for emitting ultrasound signals with electronic delays the aim of which is to compensate for the time differences of the ultrasound signals when traveling in the propagating medium between a focus point and each element. On the receiving side, the ultrasound return signals of all the elements are summed with the same delay as at the emission.

Alternatively, it is also possible to focus on reception only with a multi element transducer (annular or array). In such a case, a plane wave is emitted (without any delay) and the focusing is performed based on the different ultrasound echoes received. More particularly, focalization is adapted continuously depending on the location the echoes are generated from, by focalizing at this location. Electronic delays are dynamically adjusted in reception on digitized signals. This technique called "pursuit focal" improves the SNR and increases the depth of field.

In a general manner, it is to be noted that when focusing is performed in reception only, the BFA does not perform focusing on the emitted ultrasound beam.

In a general manner, the transducer focal distance in the UTS of FIG. 2 may be adjustable, in particular for a multi element transducer, such as a multi element annular array and a 1D array.

The transducer focal distance may be less than or equal to 20 mm, preferably less than 10 mm. A focal distance between 12 and 15 mm may be envisaged for a mono element transducer and an annular array.

In a general manner, in addition or alternately to the above focal distance aspects, the transducer depth of field in the UTS of FIG. 2 may be adjustable.

The transducer depth of field may be greater than or equal to 2 mm, preferably greater than or equal to 5 mm.

The following table describes different exemplary embodiments used for 2D and 3D imaging involving different beam scanning (mechanical and/or electronical) and focusing operational modes for different ultrasound transducer systems configurations (several types of focused or unfocused transducers associated with focused or unfocused acoustic reflectors):

| Transducer type | Scanning means and focusing means |
|---|---|
| 2D Imaging | |
| unfocused Mono element transducer | Mechanical scan of a focused reflector |
| focused Mono element transducer | Mechanical scan of the transducer or of an unfocused reflector (plano reflector) |
| Multi-element annular transducer | Mechanical scan of the transducer or of a focused or unfocused reflector (plano reflector). The electronic beam forming and scanning assembly allows to focus the beam and increase the depth of field |
| 1D array transducer | Electronic scan (linear, sectorial or combination thereof) |
| 3D imaging | |
| unfocused Mono element transducer ( ) | Mechanical scan of a focused reflector along 2 axis |
| focused Mono element transducer ( ) | Mechanical scan of the transducer and/or of an unfocused reflector (plano reflector) along 2 axis. |
| Multi-element annular transducer ( ) | Mechanical scan of the transducer and/or of an focused or unfocused reflector (plano reflector). The electronic beam forming and scanning assembly allows to focus the beam and increase the depth of field |
| 1D array transducer | Electronic scan (linear, sectorial or combination thereof) + mechanical scan of the transducer or reflector |
| 2D array transducer | Electronic scan |

Thus, scanning an ultrasound beam may be performed through different ultrasound transducer systems configurations, e.g. through mechanically scanning or sweeping (by swinging) an acoustic reflector associated with at least one transducer (mono-element or multi-element annular or 1D array or 2D arrays) Linear motion can also be used.

A transducer may be swept mechanically by rotating or swinging. A 1D array transducer may be used to sweep the beam electronically.

A specialized probe member that mechanically scans a conventional 2D image transducer can be used. 2D array transducers can sweep the beam in 3D. These transducers can generate images faster and can even be used to make live or real time 3D images.

In case of a manual probe member scan for generating 3D images, the probe member may also comprise an accelerometer, gyroscope, or a position sensor. Such an additional element may be useful to determine the position of the probe member, which may help when the probe member is also manually moved by the practitioner to extend the area to be imaged. The spatial position of the probe member is recorded (through a processing unit and storage memories). In particular, the position of the probe member relative to the soft tissue may be known and possible recorded.

As briefly mentioned above, FIG. 3 depicts different types of scanning motion to acquire 3D images (electronic and/or mechanical scanning motion of a transducer, e.g. a 1D or 2D array transducer, and/or an acoustic reflector) to be used in the present dental system or probe member, i.e., linear-linear along the two axes, sectorial linear, sectorial-sectorial and sectorial-rotation. Other types of scanning motion not depicted and described here may also be envisaged.

Scanning an ultrasound beam may be performed using at least one actuator which may be of different types: mechanical, electromechanical, pneumatic, hydraulic, electric, thermal, shape memory etc.

The motion performed by the actuator can be varied. It can be a rotating motion, a linear motion, a combination thereof, a pendular motion, or any other adapted motion.

For example, the actuator may comprise an electromechanical system (electromechanical motor such as a brushless motor), a micromotor, a piezoelectric motor, a pneumatic motor, a hydraulic motor etc.

The dental system DS may also comprise electronic control assembly ECA so as to control the operation of the above components: the ultrasound transducer system UTS and the beam forming and scanning assembly BFA of FIG. 2.

As represented in FIG. 2, the electronic control assembly ECA may comprise a reconstructing unit or assembly RU configured for providing a digital image based on the ultrasound return signal. The digital image may then be transmitted through a transmitting unit or assembly TR, via a wired or wireless connection, to a remote device comprising, in particular, a display assembly ID for displaying the digital image. The remote device may be located in the same room as the dental system, e.g. one or several meters away or in a separate place.

Reconstructing unit or assembly RU and transmitting unit or assembly TR may be located in the probe member, which is for example a probe head or a probe body. However, Reconstructing unit or assembly RU and transmitting unit or assembly TR or only one of them may be located in the probe body in order to reduce the size of the probe head.

In an alternative embodiment, the dental system DS may comprise a transmitting unit or assembly TR for transmitting, via a wired or wireless connection, the ultrasound return signal and/or control information to a remote device comprising, in particular, a reconstructing unit or assembly RU' configured for providing a digital image based on the ultrasound return signal and a display assembly ID for displaying the digital image.

In another embodiment, the dental system DS may comprise a receiving unit for receiving control information from a remote device or site (e.g. a computing device used by the practitioner and equipped with a user interface allowing the user to select information to be transmitted to the dental system or probe member). Such control information may be used, when received by the dental system or probe member, for modifying operating or setting parameters thereof, as gain, on/off, data acquisition, focus position, ultrasound frequency, scanning range (line density), scanning speed, etc.

Control information may also be transmitted outside the dental system or probe member to inform the practitioner of current information concerning the operation of the latter (e.g. operating parameters such as probe temperature (for example to avoid burning the patient), temperature of the coupling medium, pressure of the coupling medium, kind of probe head (this information may be obtained based on a recognition/identifying system that may be located at least partially in the probe body) etc.

To be noted that the reconstructing unit or assembly RU or RU' more particularly includes a processor (microprocessor) or processing unit and data storage capacity (ex: memory or memories) for storing data (either raw data from the ultrasound return signal and possible control information or reconstructed digital image signals).

The processor and data storage capacity may be part of electronic control assembly.

The processor and data storage capacity may also be shared with (or used by) the beam forming and scanning assembly BFA.

In a case where the reconstructing unit or assembly RU' is in a remote device, the ECA has its own processor or processing unit and data storage capacity so as to perform the above control and drive tasks on the UTS and BFA.

Electronic control assembly ECA may be located in the probe member, e.g. in the probe head or probe body of the probe including a probe head and a probe body assembled together.

Electronic control assembly ECA may take several configurations and comprise different components, in particular depending on the ultrasound transducer elements.

Figure 4:
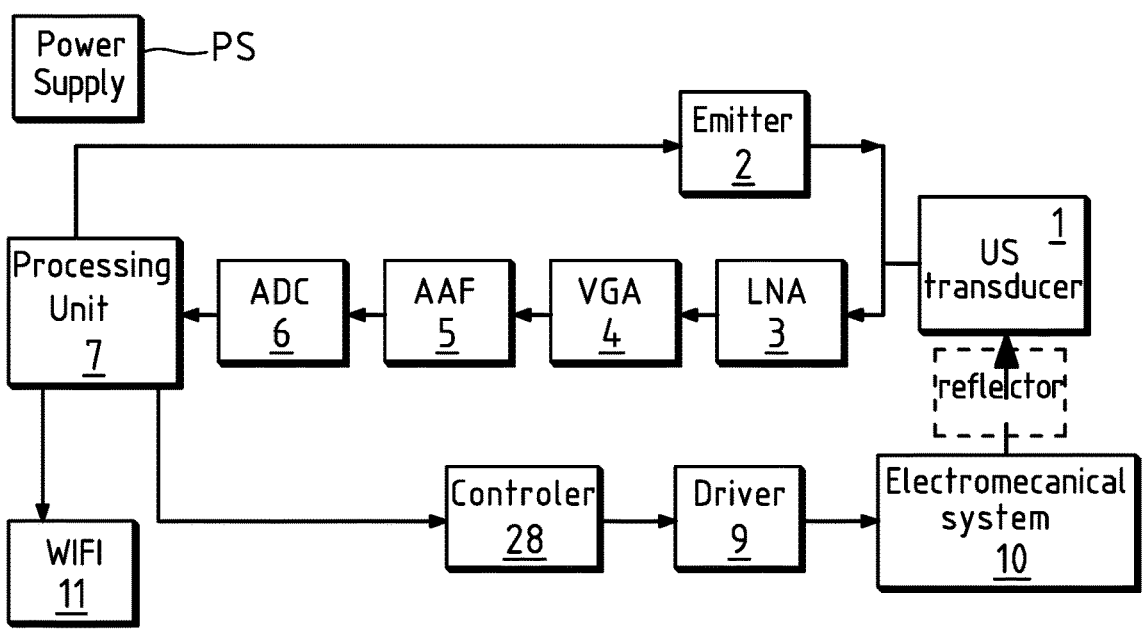
FIGS. 4 to 7 illustrate exemplary embodiments of a dental system such as dental system DS of FIG. 2.

An exemplary detailed dental system is illustrated in FIG. 4 embodiment and may comprise a mono transducer element 1, an emitter or emitting component 2 that generates the excitation signal of the ultrasound transducer 1. This transducer that operates as both an emitting and receiving transducer may be focused or not (if an acoustic reflector is used, focusing of the transducer is not necessary). This transducer may be scanned in a scanning motion or not. The excitation signal is either a very short pulse (as a Dirac pulse) that is suitable for exciting the transducer on its own proper frequency or a sinewave burst which is suitable for causing forced excitation (through this forced excitation the transducer may be caused to operate at different operating frequencies). This may be useful for adjusting the depth of field and resolution.

The dental system may also comprise on the receiving side of the circuit for receiving the ultrasound return signal produced by (or corresponding to the sum of) the echoes on the different structures encountered by the ultrasound beam:
  a low noise amplifier LNA 3,
  a variable gain amplifier VGA 4,
  a low pass filter or anti-aliasing filter AAF 5,
  an analog to digital converter or digitizer ADC 6 for digitally converting the received and pre-processed analog acoustic signal, and
  a processing unit or processor 7 which processes the digitized signal.

Processing unit 7 may correspond to reconstruction unit RU in FIG. 2.

To be noted that the above different pre-processing stages applied to the received signal make it possible to shape and remove from the signal noise and other parasitic data that could otherwise impair its processing and/or affect the quality of the images generated by the dental system or probe. These pre-processing stages may vary and some of them may be omitted in certain circumstances.

In a general manner, in order to improve the signal/noise ratio, the above-mentioned range of operating frequencies (either the wider one or one of the reduced ones) requires/ can have a pre-amplification stage close to the transducer(s) or integrated to the transducer(s).

Processing unit controls and drives the emitter 2, in particular through a beam former (not represented) which may focus the ultrasound beam and increase its depth of field.

A power supply PS may be provided for powering the different components of the circuit. Alternatively, a power cord or cable may be provided to supply power.

The dental system may also comprise a controller 8 and a driver 9 that control and operate an actuator 10 which may be here an electromechanical system 10. The latter is therefore controlled and operated to drive an acoustic reflector for causing its oscillation (swinging movement) and achieving a scanning motion of the ultrasound beam.

To be noted that the reflector and the actuator may be omitted in other embodiments. For example, in such other embodiments the ultrasound transducer or transducers may be focused or not or may be driven in a scanning motion through an actuator (or electronically) which may be an electromechanical system such as the actuator 10.

In the present embodiment, the dental system may further comprise a wireless transmission unit 11 which may be the same as that already described in relation with FIG. 2 (TR) for transmitting a digital image or a raw signal. Unit 11 may also include a receiving unit which is suitable for receiving control information from outside (e.g. from a device handled by the practitioner), for example information used/required for the beam scanning.

In the present embodiment, the electronic components 2 to 7 and 9 to 11 may not be integrated into the transducer(s) 1. For example, these components may be located in the probe body when the probe comprises a probe body and a probe head assembled together. The probe head for its part may contain transducer(s) 1 and actuator 8 with the reflector.

In another embodiment not depicted here (this embodiment may include or not the reflector and actuator 8), the probe head may also contain components 2 to 6 which may be adjacent to or integrated in transducer(s) 1. This arrangement makes it possible to reduce the length and/or number of electric cables between the components and transducer(s) 1. Higher SNR and greater sensibility may thus be achieved. Also, cost reduction may be envisaged.

The probe body may then contain components 7 and 9 to 11.

Figure 5:
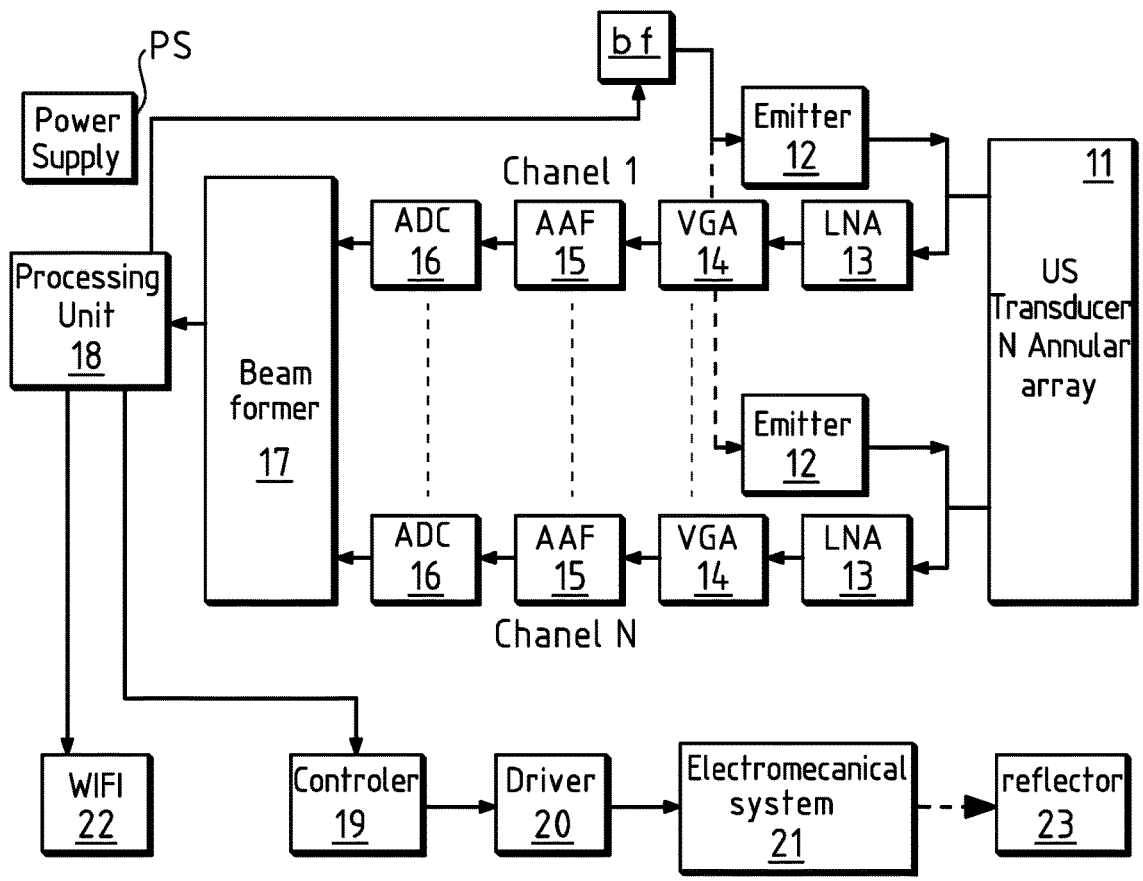

In another embodiment illustrated in FIG. 5, the ultrasound transducer system comprises a multi element annular transducer 11 which represents here an N annular array. A common beam former bf, controlled by processing unit 18, which may focus the whole ultrasound beam generated by the UTS and increase its depth of field is provided upstream the emitters 12 so as to apply appropriate delays to the different emitters.

The dental system may comprise N electronic circuits and associated components for emitting ultrasound beams and receiving and processing the received ultrasound return signals. As represented, the dental system comprises N circuits comprising each the components 12, 13, 14, 15, 16 which correspond to components 2 to 6 of FIG. 4 respectively. Each circuit is dedicated to one of the N annular transducer elements.

The dental system also comprises in reception a beam former 17 which is used to collect and assemble the digitized signals received by all the annular transducer elements, while taking into account the different delays, in order to reconstruct a whole digitized signal before transmitting the latter to the processing unit or processor 18.

The chain of control connecting the processing unit 18 to the controller 19, the driver 20, the actuator 21 and the acoustic reflector 23 may be identical to the description made above with reference to FIG. 4 as well as its variant embodiments.

Unit 22 is identical to unit 11 of FIG. 4.

The different variant embodiments described in relation with FIG. 4 also applies to the system of FIG. 5.

By way of example, the probe head may comprise electronic components 11 to 17 and 23 and the probe body may comprise components 18 to 22.

By way of example, the ultrasound transducer array 11 is made of PVDF on silicon or cMut. The transducer may comprise at least 6 annular transducer elements and possibly 12 or 16.

Figure 6:
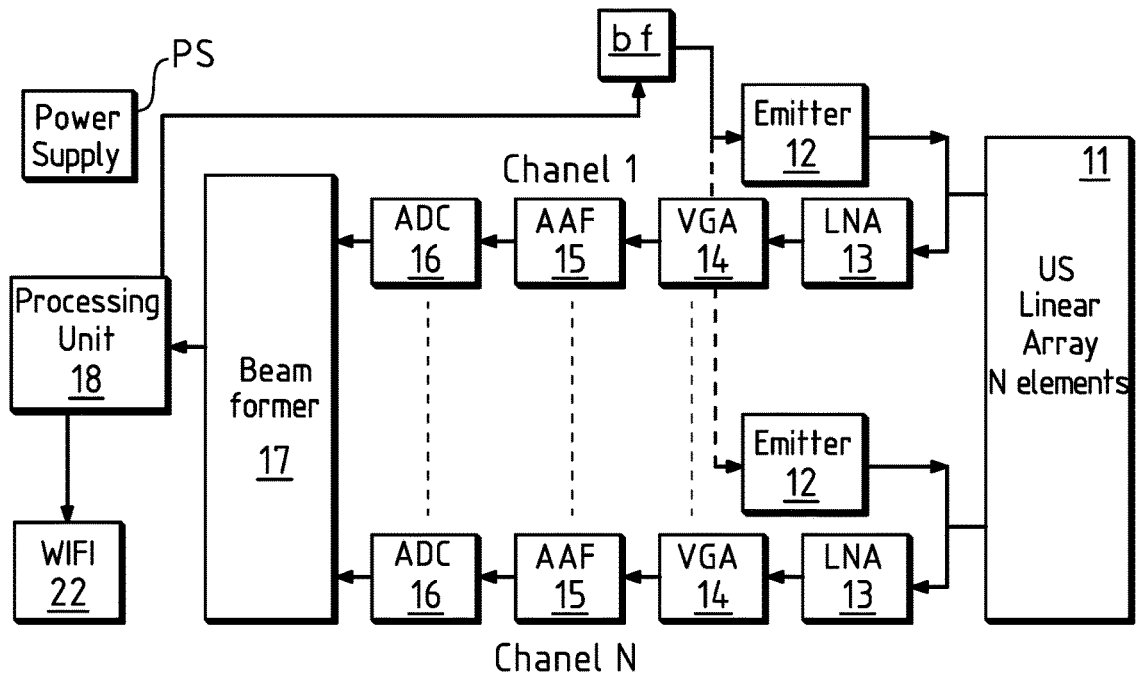

In another embodiment illustrated in FIG. 6, the ultrasound transducer system comprises an ultrasound linear multi element transducer which represents here a linear array made of N transducer elements. Each of the N transducer elements has its own signal pre-processing treatment as in FIG. 4 for the multi element annular array. To be noted that this embodiment applies both to 1D and 2D arrays. The description of FIG. 5 also applies here as well as its variant embodiments. The same numbering has been taken over here for the sake of simplicity. In the present embodiment, the ultrasound linear array can be a 64-element transducer.

Beam former 17 can be a FPGA (Field Programmable Gate Array) circuit.

By way of example, the probe head may comprise electronic components 11 to 16 and the probe body may comprise components 17, 18 and 22.

Figure 7:
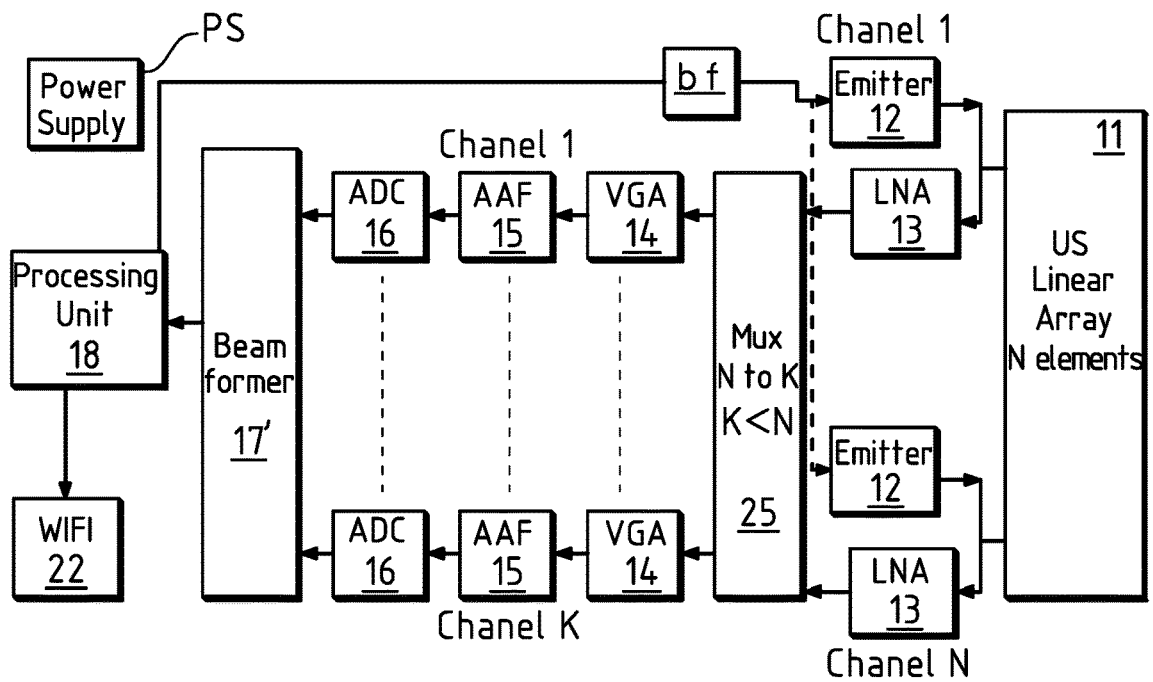

In another embodiment illustrated in FIG. 7, the dental system further comprises a multiplexer 25 which makes it possible to reduce the number of electronic components integrated on the transducer chip, in particular, the number of ADCs.

In FIG. 6, there were N channels for pre-processing the signals received by the N transducer elements.

In contrast, in FIG. 7 there are only K channels (K<N). The multiplexer 25 receives the N amplified signals from LNA components 13 or the like and distributes K output multiplexed signals over the K channels for pre-processing purpose. This can lead to a better integration of the components on the chip. The size of beam former 17' may also be reduced since a reduced number of signals has to be processed by the latter compared to beam former 17 of FIG. 6. By way of example, the probe head may comprise electronic components 11 to 16 and 25 and the probe body may comprise components 17', 18 and 22.

In the FIGS. 4 to 7 embodiments the acoustic reflector and its actuator may be replaced by a system for scanning or oscillating the transducer(s).

The transducer or transducers may be of the following type: focused mono-element transducer, unfocused mono-element transducer, focused multi-element annular transducer, unfocused multi-element annular transducer, 1D array or 2D array etc.

Different technologies may be used for the transducer or transducers among which: a capacitive micromachined Ultrasound transducer (CMUT); a polyvinylidene fluoride-trifluoroethylene transducer (PVDF-TrFE), a piezoelectric ceramic transducer (PZT, $LiNbO_3$), an electrostatic transducer etc.

The transducer can also be a PVDF transducer, a composite transducer. Exemplary transducers may also include a silicon wafer and/or a backing element. The backing element may also focus the ultrasound beam by having a concave shape. The backing element can be manufactured using 3D printing. Different types of ultrasound transducers, different ultrasound transducer and ultrasound transducer system configurations may be envisaged in any of the above embodiments except if the embodiment is dedicated to only a specific type or configuration.

FIGS. 8 to 13 disclose different exemplary transducer configurations with different spatial orientations which may be used. To be noted that in the previous embodiments the different transducers used may be considered as both emitting and receiving transducers whatever they are mono element or multi element transducers.

Figure 8:
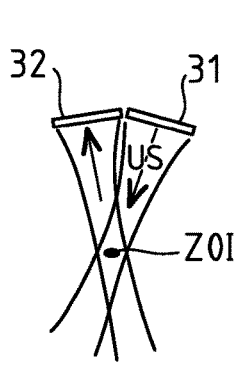
FIGS. 8 and 9 illustrate several possible transducers arrangements.

FIG. 8 illustrates a configuration with an emitting ultrasound transducer 31 and a receiving ultrasound transducer 32 which are both spatially arranged for covering a zone of interest (ZOI) of a soft tissue in an intra oral cavity. Both transducers are laterally offset and oriented towards the ZOI in a convergent configuration so that the ultrasound echoes of the emitted beam is received by transducer 32.

Figure 9:
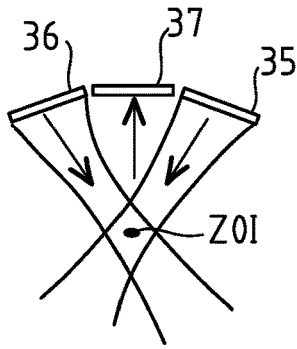

In FIG. 9 two spaced apart ultrasound emitting transducers 35, 36 angularly oriented towards the ZOI are located on either side of a central axially oriented ultrasound receiving transducer 37 which receives the ultrasound echoes from the facing ZOI. The reverse arrangement may also be envisaged: one emitting transducer and two or more spaced apart receiving transducers.

Figure 10:
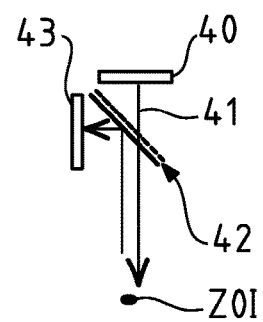
FIGS. 10 to 13 illustrate several possible photoacoustic transducer arrangements.

FIG. 10 illustrates a further configuration in which an emitting transducer 40 emits an ultrasound beam 41 towards a ZOI facing the transducer. The beam 41 traverses an acoustic beam splitter 42 of which a first face enables transmission of the beam in this way of transmission. The ultrasound echoes sent back by the ZOI propagate axially in the reverse direction relative to the emitted beam but are reflected by the opposite second face of acoustic beam splitter 42 which diverts them towards a receiving transducer 43.

In this example the acoustic beam splitter 42 is oriented at 450 and receiving transducer 43 is therefore arranged at right angle to emitting transducer 40. However, other spatial arrangements may be envisaged.

Figure 11:
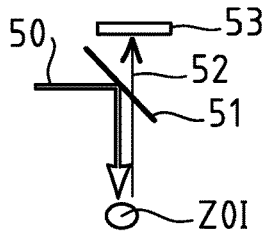
Figure 12:
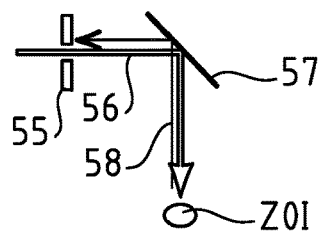
Figure 13:
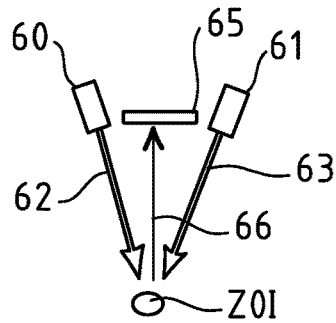

FIGS. 11 to 13 illustrate configurations concerning another aspect which is independent from the general probe member described above. This new aspect concerns a dental system/dental probe member (probe head/probe body) and associated method. To be noted that the different structures, casing configurations, methods installation, equipment, technical details etc. described above and below may apply to this new aspect.

According to this aspect, in a general manner, there is provided a probe member intended to be used for 2D and/or 3D imaging a soft tissue ST in an intra oral cavity, i.e. the mouth of a patient. Dental system or probe member mainly comprises:
 an acoustic window AW intended to face the soft tissue ST to be imaged;
 a transducer system TS configured for:
  emitting a beam signal through the acoustic window along at least one axis;
  receiving a corresponding ultrasound return signal through the acoustic window;
A beam forming and scanning assembly BFA may be configured for driving the beam axis through the acoustic window.

In particular, the beam signal may be a laser beam signal, e.g. generated by a pulsed laser. The pulses are generally of short duration, i.e. between 2 and 20 ns and separate in time. The laser beam may be emitted with a specific wavelength in the range between 500 and 1100 nm, preferably between 680 and 900 nm. The operating frequency is selected depending on the absorption capacity of the tissue to be imaged. The frequency may be selected by increment of 5 nm in the above-reduced range.

The laser beam encountering certain soft tissues, in particular those containing blood, will be absorbed by such tissues. This will give rise to a sudden temperature increase in the tissues and localized dilatation thereof.

This rapid dilatation will cause generation of ultrasound waves that will be received by at least one ultrasound transducer (mono or multi element of one of the types described above). The frequency of these waves generally lies within the range between 20 and 50 MHz. The frequency depends on the pulses width. Based on the received ultrasound return signal, localization of the ultrasound signal source is made possible. The intensity of the signal source varies with the portion of the absorbing tissues.

To be noted that cuttlefish or squid ink which is very sensitive to the laser wavelength may be used for rinsing the patient's mouth before implementing the 2D/3D imaging method according to this new aspect.

The ink then penetrates in the periodontal pockets, which makes it possible to image/observe them through this imaging method.

Thanks to this technique, tissues irrigated with oxygenated blood can be distinguished from tissues irrigated with non oxygenated blood.

FIG. 11 illustrates a configuration where a laser beam or light beam 50 emitted by a laser source (pulsed laser) impinges on an optical mirror 51 which, for an incident angle, reflects the beam towards a ZOI.

The ultrasound echoes (ultrasound return signal) 52 generated by the ZOI propagate through the optical mirror 51 and reach at least one receiving ultrasound transducer 53. Scanning of the transducer (as described above) may be performed. FIG. 12 depicts a configuration with at least one receiving ultrasound transducer 55 provided with a hole in the middle for allowing light or laser emitted beam 56 to propagate therethrough and to be reflected towards a ZOI by an acoustical and optical mirror 57.

The ZOI returns an ultrasound echo 58 towards the mirror 57 which reflects it back to receiving transducer 55.

Scanning of the mirror 57 (as described above) may be performed.

Acoustical and optical mirror 57 may use a material such as a porous ceramic (ex: Macor) which possesses a high acoustical impedance so as to reflect the laser beam and ultrasound return signals and which has attenuation properties in order to avoid the formation of waves inside the mirror. In order to reflect the ultrasound beam a thin layer of a reflector is deposited on one face of the mirror.

A multi annular element transducer may be used preferably for FIG. 12 configuration.

FIG. 13 depicts a configuration with two light guides or generators 60, 61 that direct two converging light or laser beams 62, 63 respectively on a ZOI.

An ultrasound receiving transducer 65 is axially disposed in front of the ZOI between the two light or laser guides or generators 60, 61 so as to receive an ultrasound return signal 66 returned by the ZOI.

For FIGS. 11 and 13 configurations linear array transducers may be used with a laser emitting a laser beam along a line.

Figure 14:
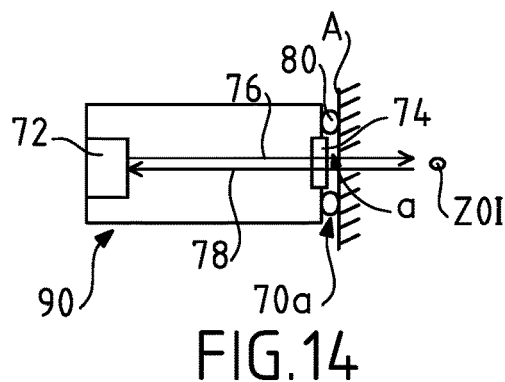
FIGS. 14, 15A and 16 illustrate several possible dental probe member casing configurations.

The FIG. 14 and following illustrate several configurations according to different embodiments.

FIG. 14 represents a casing 70 accommodating the ultrasound transducer system UTS of FIG. 2.

To be noted that casing 70 may represent the envelope of a probe member which may correspond to a probe head. The probe body removably attached to the probe head and forming the remaining part of the probe being omitted here for the sake of clarity.

In the present embodiment, the UTS may comprise at least one ultrasound transducer 72 which may integrate some or all of the above described electronic components. Casing 70 may also include (although not represented here) the beam forming and scanning assembly BFA of FIG. 2. This may also hold true for the following embodiments and variants to be described.

The acoustic window AW of FIG. 2 may be present in a wall of the casing. The acoustic window 74 is arranged in a wall facing the front face (emitting face) of the transducer. The ZOI is facing the acoustic window 74 and the transducer 72. The ultrasound beam 76 and the ultrasound return signal 78 propagate here in a rectilinear fashion through acoustic window 74.

The acoustic window 74 may be open or closed, e.g. with an acoustic membrane which may be a semi-permeable membrane.

A closed acoustic window proves to be useful for sterilization purpose.

The casing (or the probe head) may further comprise an outside conformable material portion 80 that is suitable for being conformed to an area A of the soft tissue to be imaged (area A may be an area surrounding the area of the soft tissue through which the beam will travel). In the present embodiment, the outside conformable material portion is located externally around the acoustic window 74.

The outside conformable material portion 80 externally surrounds an external area a that is at least partly located in front of the acoustic window 74.

In an example, the outside conformable material portion 80 is a conformable gasket.

Alternatively, an outside portion or wall of the casing itself and that surrounds the acoustic window may be configured to conform to a surrounding area of the soft tissue to be imaged. This variant embodiment may also apply to the following embodiments and variants to be described.

In a variant embodiment the casing (or probe member/head) has a front tip 70a (FIG. 14) that is suitable to be deformed, e.g. curved during operation of the device so as to conform to the soft tissue in contact therewith. Such an arrangement makes also possible to change the spatial/angular orientation of the front tip relative to the tissue. This variant embodiment may also apply to the following embodiments and variants to be described.

It is to be noted that the above-described outside conformable material portions (conformable gaskets or the like) and their variants surround the acoustic window and allow the casing (probe member or probe head) to be in contact with the soft tissue to be imaged (through the conformable portions) without being compressed. The transducer 72 may be located at a distance from the acoustic window 74, as illustrated in FIG. 14 or closer.

Figure 15A:
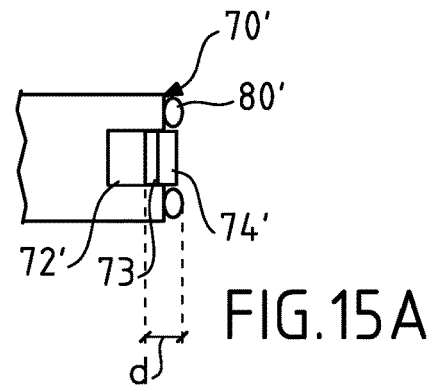

In a variant embodiment illustrated in FIG. 15A the transducer 72' may be located next to the closed acoustic window 74' with an interposition layer 73 of coupling material, e.g. coupling gel, between transducer 72' and acoustic window 74'.

Here the outside conformable material portion 80' plays the role of a contact zone of the casing (or probe head) with the soft tissue to be imaged. However, the external wall of the casing itself may play this role in a variant embodiment.

Whatever the case, the transducer 72' may be located at a distance d (see FIG. 15A) of at least 2 mm from the outside contact zone 80' so that the acoustic beam travels at least such a distance before reaching the ZOI. This arrangement makes it possible to obtain satisfactory focalization for the beam on the exploration zone. For a multi element annular transducer or array, a greater distance of at least 10 mm may be envisaged.

Figure 15B:
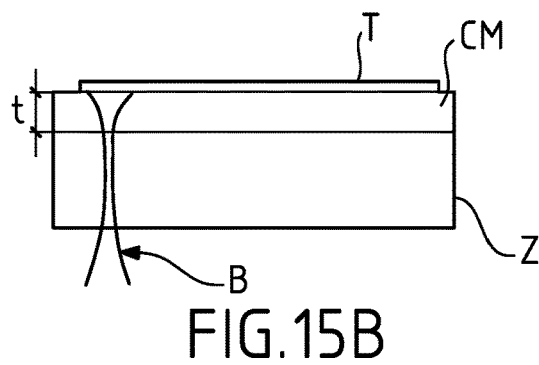
FIG. 15B is an enlarged view of a transducer "coupled" to a zone to be imaged.

FIG. 15B is an enlarged view of an arrangement of a transducer array T with a coupling medium CM (e.g. a liquid or a gel, a specified material such as a specific polymer having low attenuation and adapted acoustic impedance etc.) in front of the transducer the front face of which is exposed to the coupling medium. An ultrasound beam emitted by plural elements of the array has been represented and indicated by B. This arrangement shows the location of the optimal image zone Z (where the ZOI is present) downstream the coupling medium CM. The thickness t (e.g. of few millimeters) of the coupling medium layer is suitable for giving rise to focusing the beam on the optimal image zone at a controlled distance from the transducer. The optimal focalization cannot be close to the transducer due to emission of the plural transducer elements with controlled delay.

Figure 16:
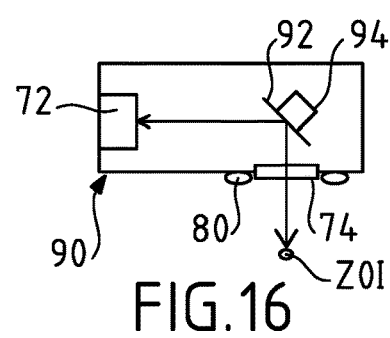

FIG. 16 illustrates an ultrasound transducer system configuration comprising in a casing 90, the at least one transducer 72, the acoustic window 74 and the outside conformable material portion 80.

These elements may be identical to those of FIGS. 14 and 15 already described. The acoustic window 74 is arranged on one of the side walls of the casing and the ultrasound transducer system comprises within the casing an acoustic reflector 92 and an actuator 94 (e.g. an electromechanical system or an actuator of the type described above) for imparting a scanning motion to the reflector.

The reflector may be focused or not, as well as the transducer.

In a variant embodiment, the actuator may be omitted, e.g. when electronic scanning is envisaged.

The reflector associated with the transducer allows the ultrasound beam to be reflected and directed through the acoustic window and the return signal to reach the transducer on return path.

The above description of the different embodiments and combinations of the transducers and scanning and focusing means of the table may apply here.

The above description of FIGS. 14 and 15 embodiments and their variants also apply to FIG. 16 embodiment.

A coupling medium is generally used in connection with the dental system/probe member of FIG. 2. Water proves to be an efficient coupling medium for ultrasound signals in the above-described frequency range.

A coupling medium may be used with the above-described embodiments, more particularly those of FIGS. 14 to 16 and their variants for a better propagation of ultrasound signals at the selected frequency or frequencies from the at least one transducer to the ZOI and the reverse path.

The casing illustrated in each of FIGS. 14 to 16 may be filled with a coupling medium.

It is to be noted that the coupling medium may not be liquid when no motion occurs within the casing. This is the case for instance in FIGS. 14, 15A, and FIGS. 21 to 23. According to such a case, the embodiments of FIGS. 21 to 23 should be modified accordingly so that the coupling medium does not behave as a fluid but rather as a solid or a material as a gel.

In contrast, when motion is to occur in the casing, e.g. since a reflector and/or a transducer is to be driven into motion for scanning purpose, then the coupling medium is preferably a liquid, e.g. water.

To be noted that the coupling medium may be static or flowing inside the casing depending on the circumstances or applications or configurations.

The front face or emitting face of the at least one transducer is preferably in contact or exposed to such a coupling medium for efficiency of operation. In the FIG. 16 embodiment, the acoustic reflector 92 and the optional actuator may be immersed in the coupling medium filling the casing. However, the electrical connections and wires have to be protected from any contact with the coupling medium.

In an alternative embodiment to FIGS. 14 to 16 embodiments, the inner of the casing may be configured so that only a face of the acoustic reflector be exposed to the coupling medium. The actuator may be located on the other side and outside of the coupling medium.

Figure 17:
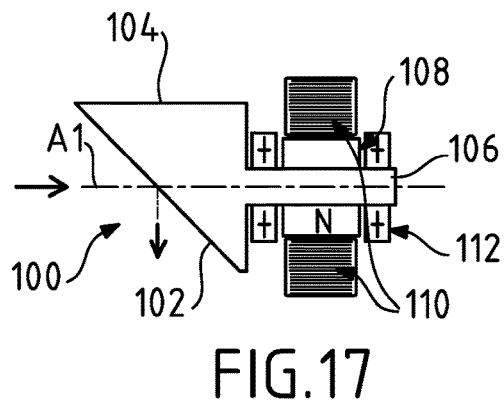
FIG. 17 illustrates an exemplary embodiment of an immersed motor.

FIG. 17 illustrates a possible arrangement comprising an actuator 100 for actuating an acoustic reflector 102 and that can be immersed in a coupling medium.

The actuator may be a motor that can operate in water, e.g. a synchronous brushless motor.

In particular, the arrangement includes the acoustic reflector 102 that is inclined relative to an axis A that corresponds to the axis of the emitted ultrasound beam indicated by the horizontal arrow. The acoustic reflector is made integral with a bloc 104 and a protruding horizontal shaft 106.

The arrangement further includes a magnet 108, e.g. of a cylindrical shape, that is polarized on the shaft diameter and coils 110 surrounding the magnet and that are suitable for generating a rotating magnetic field.

The arrangement also comprises miniaturized ball bearings 112 that can be made out of ceramic or plastic.

As described above, the electrical wires that supply the motor with power are liquid-tight (e.g. watertight) protected.

Figure 18:
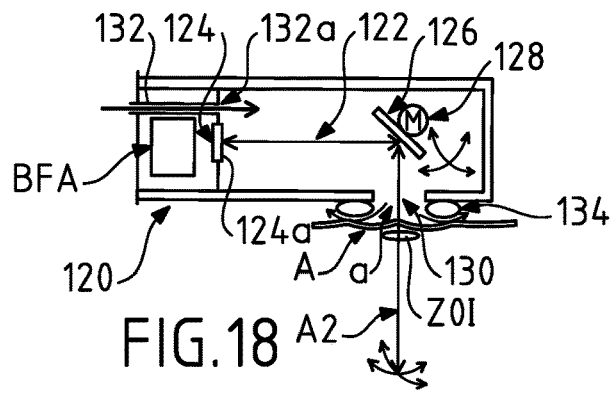
FIGS. 18 to 23 illustrate several other possible dental probe member casing configurations.

FIG. 18 illustrates a casing configuration 120 (similar to FIG. 16) with a coupling medium (here a liquid such as water) that fills the inner (chamber) 122 of the casing 120 so that the front face 124a of the at least one transducer 124 is exposed to the coupling medium and the acoustic reflector 126 and the associated actuator 128 are immersed in the coupling medium.

The acoustic window 130 (part of the casing where the ultrasound beam exits the casing) is open.

A coupling medium circuitry 132 is arranged, at least partly, in the chamber so as to introduce coupling medium therein through an inlet/outlet 132a (with a pressure or not) with a view to filling the latter.

The coupling medium may be introduced parallel to ultrasound beam emitted by the transducer 124 and sideways thereto. Here the inlet/outlet 132a is located in a part of the casing that is away from the acoustic window.

An outside conformation material portion 134, as portion 80 in FIGS. 14 and 16, surrounds the acoustic window from outside and sets boundaries for an external area or zone a that is facing the acoustic window and also the ZOI inside the soft tissue A. To be noted that zone a may be considered as a reservoir filled with coupling medium.

The zone a is kept free from air when the casing of the probe member or probe is applied against the soft tissue to be imaged thanks to the coupling medium.

The exemplary conformable material portion (conformable gasket or the like) 134 allows to maintain coupling medium on the soft tissue to be imaged. This will also hold true in the following embodiments with a closed acoustic window.

Axis A2 represents the axis of the ultrasound beam (reflected by acoustic reflector 126) that is directed to the ZOI. This beam is driven into a scanning motion thanks to the actuator 128 that drives the oscillation motion of the reflector along an axis of rotation (e.g. perpendicular to the plane of FIG. 18). Oscillation motion can also be driven along several axis as represented by the double arrow so as to generate a more appropriate motion according to the type of imaging to be performed and/or ZOI to be imaged.

Conformable portion 134, e.g. a conformable gasket, is in contact with soft tissue A and makes it possible to keep the chamber 122 filled with the coupling medium that flows into the latter and out through the window 130.

In the present embodiment, the actuator operates in an acoustic coupling medium (ex: liquid) which allows to reduce the head probe (or head member) size and the required power.

To be noted that the BFA, more particularly the part thereof that performs the formation of the ultrasound beam, may also be located in the casing, as close as possible to the transducer.

Figure 19:
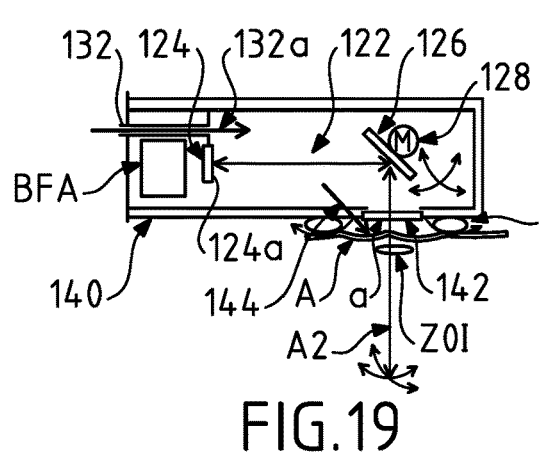

FIG. 19 illustrates another casing configuration 140 (similar to FIG. 18). Only the different parts will be described. The identical parts or elements keep the same references as on FIG. 18.

In this configuration the coupling medium that fills the inner (chamber) 122 of the casing 140. The acoustic window 142 is a closed one, e.g. an acoustic membrane that closes the chamber.

The casing is provided with an outlet or nozzle 144 that is configured for allowing the coupling medium inside the chamber to flow out therefrom and fill the area or space a between the closed window 142 and the soft tissue A to be imaged.

The outlet or nozzle 144 is located close to the window 142, in a wall of the casing and between the conformable portion 134 and the window.

In the present embodiment, the outlet or nozzle 144 is inclined towards the center of the area that is facing the window 142 as illustrated by the arrow indicating the direction of the outflow.

Figure 20:
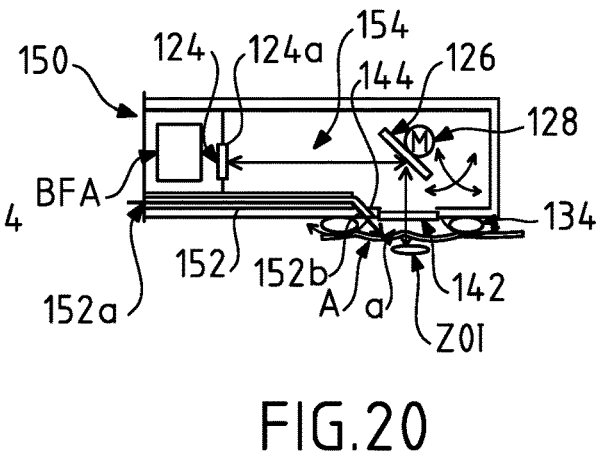

FIG. 20 illustrates another casing configuration 150 (similar to FIG. 19).

Only the different parts will be described. The identical parts or elements keep the same references as on FIG. 19.

This casing configuration comprises a coupling medium circulation circuitry that is configured for guiding the coupling medium directly into the area or space a outside the casing and facing the acoustic window 142. The circulation circuitry comprises here a channel or duct 152 that extends inside the chamber 154 until reaching the outlet or nozzle 144. Channel or duct 152 has an inlet 152a that is supplied by a flow of coupling medium and an opposite outlet 152b that is in fluid communication with outlet or nozzle 144. Channel or duct 152 may be located adjacent the inner side of one of the casing walls. In a variant embodiment, the circuitry 152 may be located at another place, e.g. outside the casing.

Contrary to FIG. 19 embodiment, in this configuration the chamber 154 is not necessarily filled with a coupling medium.

However, in a variant embodiment, chamber 154 also contains a coupling medium. The same circuitry as that of FIG. 19 may be used.

In a variant embodiment that can apply to FIGS. 19 and 20 embodiments, the closed acoustic window 142 may comprise a conformable acoustic membrane so as to directly conform to the soft tissue to be imaged.

Figure 21:
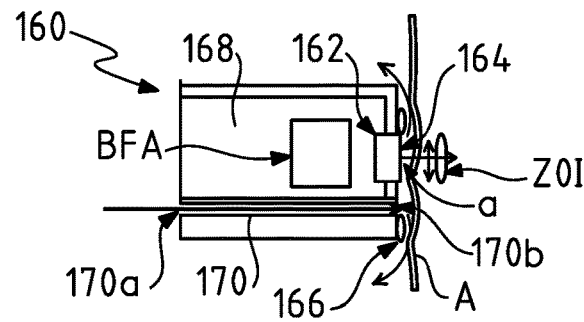
Figure 22:
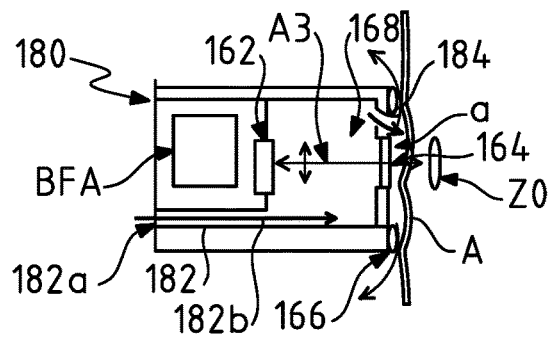
Figure 23:
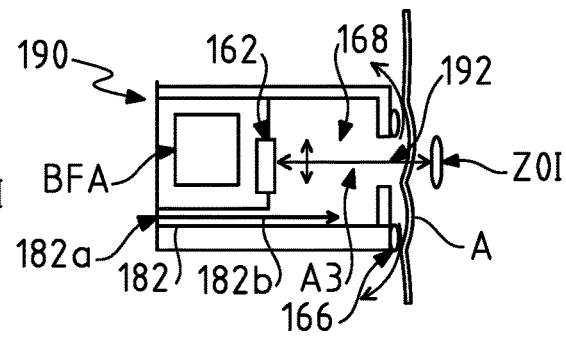

FIGS. 21 to 23 will now illustrate casing configurations that are particularly suitable for an array transducer or a multi element transducer. However, other types of transducers are not excluded.

In FIG. 21, a casing 160 includes an array or linear multi element ultrasound transducer 162 that is facing proximate a closed acoustic window 164. The same interposition coupling material arrangement as that described with reference to FIG. 15A may also apply here. In the present configuration, a coupling material layer (ex: a coupling gel) of a few millimeters may be provided, e.g. 2 mm or more. Such an arrangement makes it possible to generate a narrow ultrasound beam even for very short distances between the closed acoustic window and the ZOI.

A conformable portion 166 as the above portion 134 surrounds the acoustic window 164 and the area or space a.

As for the other embodiments the BFA may also be located in the chamber 168 where the transducer 162 is located.

This casing configuration comprises a coupling medium circulation circuitry that is configured for guiding a coupling medium directly into the area or space a outside the casing and facing the acoustic window 164. The circulation circuitry comprises here a channel or duct 170 that extends inside the chamber 168 all through an outlet or nozzle that opens out into the area a. Channel or duct 170 has an inlet 170a that is supplied by a flow of coupling medium and an opposite outlet 170b that forms the opening out outlet or nozzle.

Channel or duct 170 may be located adjacent the inner side of one of the casing walls.

In a variant embodiment, the circuitry 170 may be located at another place, e.g. outside the casing In this configuration the chamber does not need to be filled with coupling medium since a coupling material (ex: a coupling gel) is present between the transducer and the acoustic window. Here, the transducer, the coupling material and the closed acoustic window (ex: membrane) may be all mounted in an opening of a casing wall and maintained assembled together.

The casing configuration 180 of FIG. 22 differs from that of FIG. 21 in that:
  the transducer configuration 162 has been moved away from the acoustic window 164, (according to this configuration the distance between the transducer and ZOI is adjusted to be greater than or equal to 1 mm, preferably greater than or equal to 2 mm; for a transducer array or multi element the distance may even be of 10 mm or more as already described above), the coupling medium circulation circuitry 182 is now configured for filling the chamber 168, an outlet or nozzle 184 as in FIG. 19 has been provided to directly introduce the coupling medium from the chamber into area or space a.

The coupling medium circulation circuitry 182 is configured for guiding a coupling medium into the chamber 168.

The circulation circuitry comprises here a channel or duct 182 that extends inside the chamber 168. Channel or duct 182 has an inlet 182a that is supplied by a flow of coupling medium and an opposite outlet 182b that opens out into the chamber substantially in the same cross-section as that of the transducer but not farther in order not to disturb the propagation of the signals inside the chamber.

Channel or duct 170 may be located adjacent the inner side of one of the casing walls.

Axis A3 corresponds to the acoustic beam axis.

The casing configuration 190 of FIG. 23 differs from that of FIG. 22 in that the acoustic window 192 is open as in FIG. 18.

The different configurations described above may add any of the following optional features:

a temperature measurement assembly or unit for measuring the temperature of the coupling medium, a pressure measurement assembly or unit for measuring the pressure of the coupling medium, a flow metering measurement assembly or unit for measuring the flow rate of the coupling medium.

Figure 31:
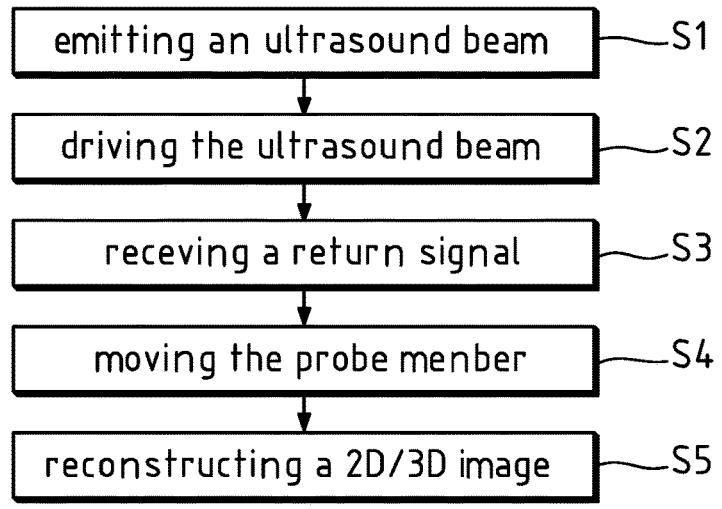
FIG. 31 is an exemplary imaging method embodiment flowchart.

The knowledge and possible control of these parameters or any of them may be useful during the operation of a method for operating a probe member (as described in any of the above embodiments and variants) or the dental system of FIG. 2 for 2D and/or 3D imaging a soft tissue in an intra oral cavity. A possible method embodiment as illustrated in FIG. 31 comprises:

emitting (step S2) an ultrasound signal in the form of a beam at a center frequency fo in the range of [10 MHz; 100 Mhz];

driving (step S3) the ultrasound beam signal through the acoustic window along at least one axis;

receiving (step S4) a corresponding ultrasound return signal through the acoustic window.

The method embodiment may further comprise a step S4 for manually moving the dental system or probe member that is applied against the soft tissue in order to enlarge the zone to be imaged. Such a possibility has already been described above in relation with a position sensor that provides spatial information/data of the dental system or probe member.

Further, the method embodiment comprises a step S5 for reconstructing a 2D and/or 3D image based on the received ultrasound return signal.

For example, knowing the pressure of the coupling medium may be useful to know the deformation of the acoustic membrane and, for example, to avoid extra pressure that could damage the latter or affect the imaging method. In such a case, the method could envisage reducing the pressure and/or flow rate of the coupling medium inside the chamber.

Knowing the temperature and/or the flow rate could also be useful to better operate the probe member (as described in any of the above embodiments and variants) or the dental system of FIG. 2.

In the different configurations described above and involving a coupling medium (a liquid or not) the purity and conductivity of the latter may also be selected and controlled for a better efficiency in the operation of the method.

The coupling medium may be bubble-free.

The coupling medium may be a biocompatible liquid.

An antiseptic agent may be optionally added to the coupling medium which may be water.

In the different configurations described above and involving a coupling medium (a liquid or not), the latter may be pressurized or not. Pressurization may be useful in certain circumstances:

to avoid bubbles in the casing;

to deform the acoustic window, e.g. an acoustic membrane, so that the latter be caused to apply against the soft tissues to be imaged.

To be noted that a deformable/flexible reservoir or pouch of coupling medium may be placed in the zone or area a that is facing the acoustic window in any of the above-described configurations or in any other more general configurations involving at least one transducer in a casing and an acoustic window with a possible outside conformable material portion (ex: gasket).

Another embodiment concerns a probe that is intended to be used for 2D and/or 3D imaging a soft tissue in an intra oral cavity. Such a dental probe comprises a probe member that may take any of the other described configurations.

The dental probe more particularly comprises a probe body and a separable probe head.

The probe head of the probe may be the probe member as described above.

The probe head and the probe body are preferably removably connected/plugged to each other for making easier any change of either part (body or head) or any internal components, and in particular for maintenance.

Figure 24:
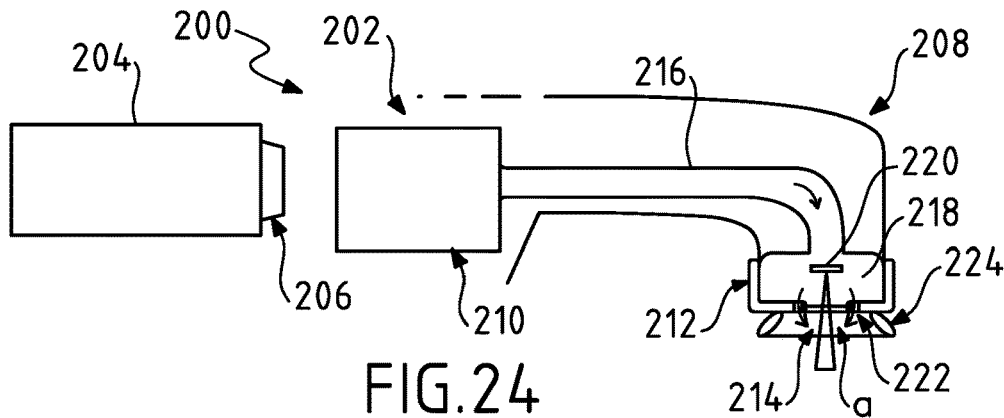
FIGS. 24 and 25 illustrate different possible protective covers for a probe head.

FIG. 24 illustrates an exemplary embodiment of such a probe 200 with a probe head 202 and a probe body 204. The different components between both parts may be shared as described above in accordance with varied embodiments and variants.

The probe may comprise a first connector 206 suitable for plugging to and unplugging the probe head 202 from the body 204. Here the connector is represented by a male portion of the body that is intended to be engaged inside a female portion (not represented) of the head. The connection between both parts may be made by screwing or by snuggly fitting the male portion into the female portion.

Figure 29:
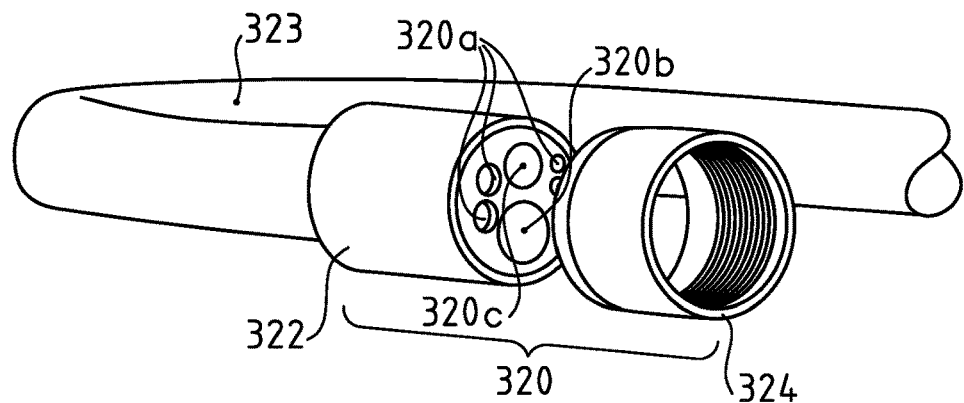
FIG. 29 is an exemplary embodiment of a connector that can be used with a dental probe member.

The first connector 206 may also comprise electrical terminals and coupling medium inlet and/or outlet (ex: water inlet and/or outlet) and optionally an air inlet/outlet. An exemplary embodiment of such a connector is illustrated in FIG. 29.

The probe head 202 comprises a probe head cover 208 covering a probe head part 210 that can be connected to the probe body 204 and a removable probe head shell 212 that comprises a closed acoustic window 214.

As represented the probe head also comprises a channel 216 for supplying the coupling medium to the chamber 218 where at least one ultrasound transducer 220 is located. The at least one transducer is generally not part of the removable probe head shell in order not to make complex any removal of the shell.

Coupling medium outlets or nozzles 222 are provided in the wall of removable probe head shell 212 that accommodates the acoustic window 214 adjacent thereto. Outlets or nozzles 222 are located on either side of the acoustic window (or alternately a single outlet or nozzle may surround the window) in a convergent manner so as to direct the coupling medium on the area or space a as described in the previous embodiments. Alternately, a single outlet or nozzle located on one side of the window as in the previous embodiments may be envisaged. To be noted that the other embodiments may also include more than one outlet or nozzle for introducing the coupling medium in area a or a single peripheral outlet or nozzle or any other configuration.

An external conformable portion 224 identical to those already described sets boundaries for the area a beyond the outlets or nozzles 222.

The removable probe head shell also comprises the outlets or nozzles 222 and the portion 224.

The removable probe head shell may be useful for sterilization purpose as it avoids to sterilize the whole probe head in an autoclave.

The probe head cover and the removable probe head shell both help to prevent/reduce contamination of the probe head.

The removable probe head shell 212 may be fit as a cover or cap around the end of head cover 208, e.g. it may be tightly fit around the end of head cover 208 or screwed onto the outer threaded end thereof.

According to a variant embodiment (not depicted here), the coupling medium outlets or nozzles 222 of FIG. 24 are eliminated by using a semipermeable acoustic membrane that allows the coupling medium to outflow from the probe head and prevent the contaminated fluid from entering into the probe head or at least reduce this fluid entry. The head probe may further comprise a pressure sensor in order to control the coupling medium flow.

Figure 25:
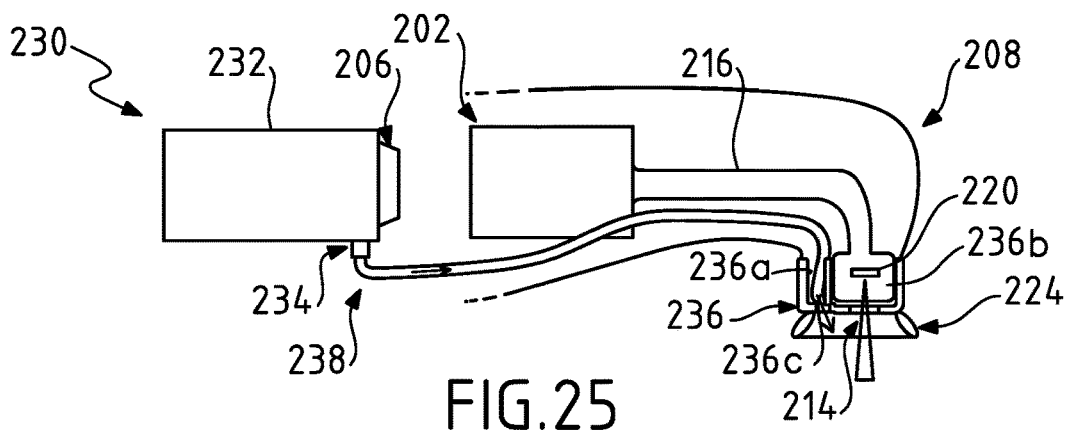

Another exemplary embodiment of a probe 230 is illustrated in FIG. 25. The elements that are identical keep the same references and will not be described again.

The probe body 232 comprises a rapid connect/disconnect connector 234 for providing a coupling medium to the removable probe head shell 236 through an external hose 238 or the like (more generally, a coupling medium circuitry that is external to the probe head part and connected to the probe body).

The removable probe head shell 236 is therefore configured accordingly to accommodate an end of the hose 238 in a compartment 236a that is separate from the other compartment or chamber 236b where the transducer 220 is located. Compartment 236a has an outlet or nozzle 236c at its bottom and the end of hose 238 is fixedly mounted onto this outlet or nozzle so that coupling medium circulating inside the hose is introduced in the external area or space a surrounded by the conformable portion 224.

Removable probe head shell 236 has therefore two internal compartments 236a and 236b, open at one side (the upper side on the drawing) and closed at the opposite side by a wall in which the closed acoustic window 214 and the outlet or nozzle 236c are provided. Shell 236 is also fit around probe head cover 208, e.g. as explained above for FIG. 25.

As represented, the coupling medium circuitry 238 is at least partially covered by the probe head cover 208.

To be noted that the different probe head cover and probe head shell in FIGS. 24 and 25 are protective covers.

Figure 26:
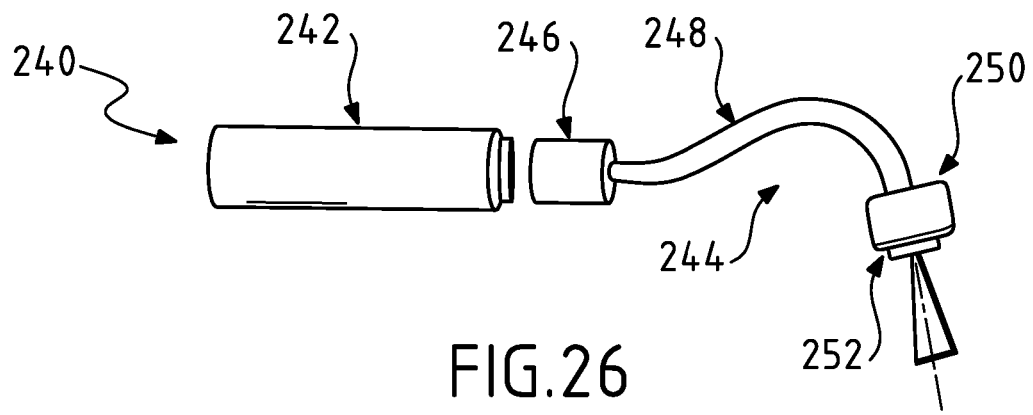
FIGS. 26 and 27 illustrate different configurations for a head probe with a bending part.
Figure 27:
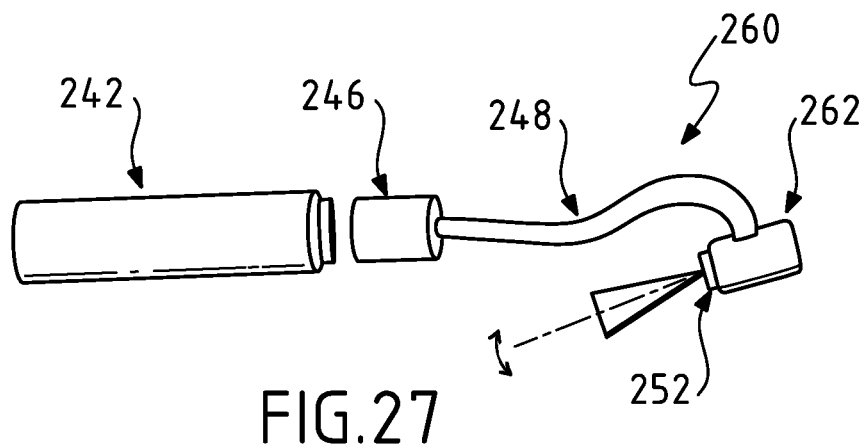

FIGS. 26 and 27 depict different probe head configurations with a probe body 242 identical to body 232 and provided with a male portion of the connector for connecting the probe body to the probe head. The probe head in each Figure includes a connecting part 246 that receives the probe body male portion and that may include electronic components necessary for operating the ultrasound transducer system.

FIG. 26 illustrates a configuration where the probe head 244 comprises:
a first probe head part 248 that is a deformable part that can be deformed by bending,
a second probe head part 250 that comprises the acoustic window and at least one transducer and that is fixedly or removably connected to part 248.

Deformable part 248 allows the practitioner to adjust the tool shape to the soft tissue to be imaged and reach zones that are of difficult access for conventional tools. Adjustment is made by easily bending the deformable part manually in whatever direction so that the head part 250 can take almost any angular orientation. This can be done repeatedly over time without damaging the deformable part 248 thanks to the flexibility of the latter.

Alternatively, deformable part 248 may be replaced by a rigid part for other applications.

Head part 250 may be provided with an outside conformable portion 250 that can be identical to the other conformable portions described above.

Alternatively, connecting part 246 only forms a connector and the electronic components are contained in the remote head part 250 as close as possible to the transducer(s).

In a variant embodiment, the probe head part 250 may be orientated in itself, e.g. due to a specific articulated connection between head part 250 and head part 248.

FIG. 27 illustrates a configuration where the probe head 260 comprises:
a first probe head part 248 that is a deformable part that can be deformed by bending (identical to head part 248 in FIG. 25),
a second probe head part 262 that comprises the acoustic window and at least one transducer and that is fixedly or removably connected to part 248.

Here the head part 262 has a configuration that enables imaging of specific zones since it has a laterally-oriented acoustic window instead of an axial one as in the previous embodiments. Axial is taken here with respect to the axis of the elongate head part 248. For example, such a configuration proves to be useful for lingual soft tissue imaging.

Figure 28:
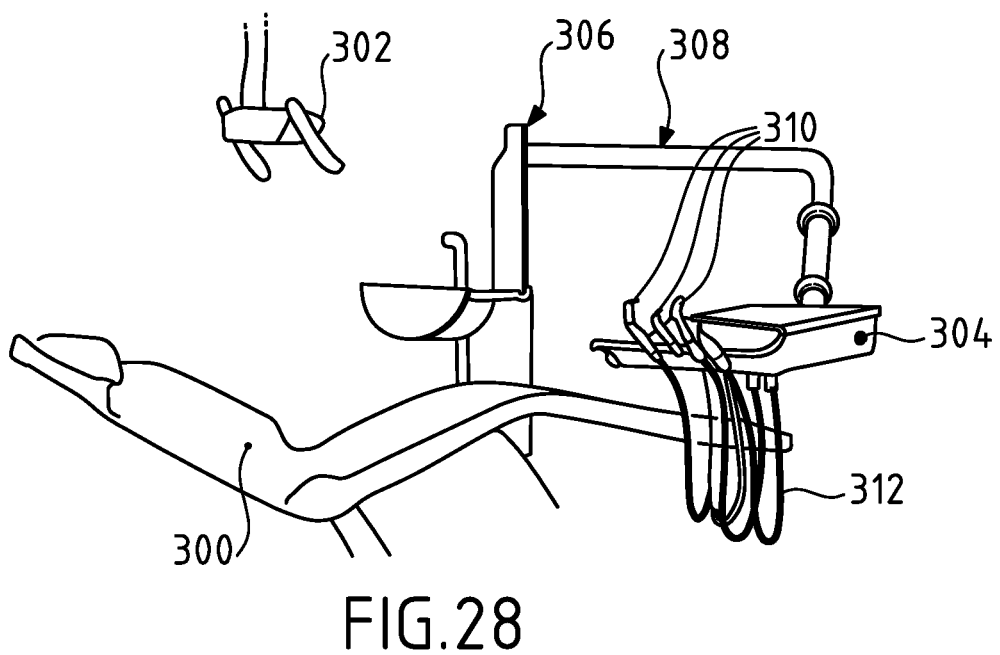
FIG. 28 represents an exemplary dentist installation.

FIG. 28 represents a dental installation including several equipment which may be used for at least some of them for operating a method for 2D and/or 3D imaging a soft tissue in an intra oral cavity.

In present embodiment, the coupling medium is water provided by the power cord of the dentist chair.

The installation includes a chair 300, a light unit 302, a dentist unit 304 that can be moved about a vertical support 306 through a linking arm 308. Dentist unit 304 carries a set of dental instruments 310 that are each connected through instrument hoses 312 to unit 304 and power, water, air etc.

The different probe member configurations (probe, probe head, probe body) described above may be mounted on the dentist installation, e.g. through a rapid connect/disconnect connector that is fixed/mounted to a hose or the like (ex: cord).

FIG. 29 illustrates an exemplary embodiment of a rapid connect/disconnect connector 320 that may also comprise electrical terminals 320a, a coupling medium (ex: liquid such as water) inlet/outlet 320b, an air inlet/outlet 320c etc. One, 322, of the two parts of the connector is mounted at an end of a hose or cord 323 which is suitable for conveying/ routing electricity (e.g. for power purpose), coupling medium, air etc. The other part 324 may be connected to a probe body of a probe.

This rapid connect/disconnect connector is suitable for connecting/disconnecting the probe body to the probe head as in FIG. 24.

It is also suitable for connecting/disconnecting different probe member configurations (probe, probe head, probe body) to one of the hoses 312 of FIG. 28.

To be noted that an air inlet/outlet that provides air to a probe member as one of those described above may be useful for removing the coupling medium inside the casing and/or the channel and nozzle. It may also be used for expelling saliva.

Figure 30:
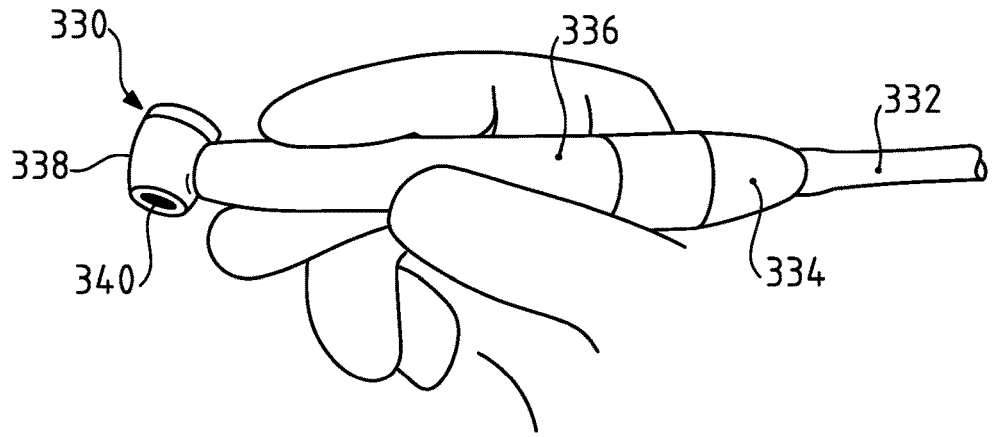
FIG. 30 is an exemplary embodiment of a dental probe.

FIG. 30 represents an instrument or tool 330 that can be used for 2D and/or 3D imaging a soft tissue in an intra oral cavity. This tool is a probe that is connected to a hose 332 routing electricity, coupling medium (ex: water), air etc. through a connector 334 (ex: a two-part connector as in FIG. 29). The tool 330 comprises a probe body 336 or hand piece that has an elongated shape so as to be conveniently grasped by the hand of a practitioner. The tool 330 also comprises a probe head 338 that is removably connected to the probe body 336. Probe head 338 is laterally oriented relative to the elongate axis of the body 336 so that the acoustic window and water outlet 340 are oriented sideways, substantially perpendicular to the axis of the body 336.

Before imaging a ZOI in a soft tissue of an intra oral cavity of a patient's head with an ultrasound beam, as already described, the method comprises:
providing a probe member or a probe as already described above;
installing the probe member or probe on the dentist equipment 304, for example by replacing one of the conventional dental instruments 310 by the probe member or probe, and plugging or mounting the latter on a dentist unit cord or hose 312,
supplying the probe member or probe with a coupling medium (here water);
dispensing the coupling medium between the acoustic window of the probe member or probe and the soft tissue to be imaged as already described above in the different possible casing configurations.

The coupling medium is dispensed with a flow rate in the above-mentioned area or space a as illustrated in FIGS. 18 to 24. As already mentioned the flow rate may be measured directly or indirectly through a pressure measurement.

The coupling medium may be continuously dispensed in area or space a between the acoustic window and the soft tissue to be imaged so as to keep the area free from air when the probe member or probe is applied against the soft tissue to be imaged.

The flow rate of the coupling medium may be controlled by at least one of the following: a pedal, an aspirating unit for aspirating liquid in a patient's mouth (as the aspirating unit that is conventionally used for aspirating saliva), a triggering member, preferably a button, image triggering etc.

In a general manner, the probe member or probe is a relatively small tool which is easy to handle and enables soft tissues to be imaged within the depth with high resolution and in real time.

In a general manner, the shape of the probe member or probe head is preferably designed to ensure patient comfort and ease to use. This holds true in particular for all the casing configurations described above.

The probe member or probe head is also designed to ensure a reduced volume probe head. This holds true in particular for all the casing configurations described above.

In a general manner, the probe or dental system can generate images in real time, i.e. at a rate greater than or equal to 10 images/s.

Thus the practitioner moves the probe against and in relation with the dental soft tissues to be imaged and observes the generated image(s) on the display assembly sufficiently rapidly, contrary to radiological exams. This holds true in particular for all the probe casing configurations described above. This is the case in particular with a mono element transducer operating at a central frequency of 30 MHz. A rate of 100 images/s can even be envisaged.

An image generated by the probe or dental system may cover a ZOI having 5-6 mm width and 10 mm depth.

In the case of periodontal use, the probe size and shape must be suitable for enabling comfort to the user and to the patient when scanning the lingual side and/or the facial side of the soft tissue.

In a general manner, the probe or dental system is not invasive and does not cause pain contrary to prior art methods. Any risk of bacterian contamination is therefore avoided.

The whole soft tissues (ex gum) can be observed.

Better resolution and better differentiation between different observed tissues can be obtained.

The probe, more particularly the probe head, has generally an elongate shape, e.g. substantially as the head of a toothbrush, and can therefore be easily introduced in the mouth of a patient and applied against any dental or periodontal region of difficult access.

The probe or dental system may be easy to handle for the practitioner.

In this respect, the probe body may be configured for being easy to grasp and handle with a hand as the toothbrush handle.

The size of the probe head is such as it can be easily introduced in the mouth of a patient. Thus the casing enclosing the transducer(s) has an external volume that does generally not exceed 1 or 2 cm3.

A probe head having approximately 10 mm length, 5 mm wide and 5 mm height or thickness may be envisaged.

The article J Radiol 2006; 87:1920-36, Gregoire et al" generally describes high-resolution imaging and is hereby incorporated in the description by reference.

Where they are used, the terms "first", "second", and so on, do not necessarily denote any ordinal or priority relation, but may be used for more clearly distinguishing one element or time interval from another. The term "exemplary" indicates that the description is used as an example, rather than implying that it is an ideal.

The term "in signal communication" as used in the application means that two or more devices and/or components are capable of communicating with each other via signals that travel over some type of signal path. Signal communication may be wired or wireless. The signals may be communication, power, data, or energy signals which may communicate information, power, and/or energy from a first device and/or component to a second device and/or component along a signal path between the first device and/or component and second device and/or component. The signal paths may include physical, electrical, magnetic, electromagnetic, optical, wired, and/or wireless connections between the first device and/or component and second device and/or component. The signal paths may also include additional devices and/or components between the first device and/or component and second device and/or component.

Consistent with exemplary embodiments, the present disclosure can use a computer program with stored instructions that control system functions for image acquisition and image data processing for image data that is stored and accessed from an electronic memory. As can be appreciated by those skilled in the image processing arts, a computer program of an exemplary embodiment of the present disclosure can be utilized by a suitable, general-purpose computer system, such as a personal computer or workstation that acts as an image processor, when provided with a suitable software program so that the processor operates to acquire, process, and display data as described herein. Many other types of computer systems architectures can be used to execute the computer program of the present disclosure, including an arrangement of networked processors, for example.

The computer program for performing exemplary method embodiments of the present disclosure may be stored in a computer readable storage medium. This medium may comprise, for example; magnetic storage media such as a magnetic disk such as a hard drive or removable device or magnetic tape; optical storage media such as an optical disc, optical tape, or machine readable optical encoding; solid state electronic storage devices such as random access memory (RAM), or read only memory (ROM); or any other physical device or medium employed to store a computer program. The computer program for performing exemplary methods of the present disclosure may also be stored on computer readable storage medium that is connected to the image processor by way of the internet or other network or communication medium. Those skilled in the image data processing arts will further readily recognize that the equivalent of such a computer program product may also be constructed in hardware.

It is noted that the term "memory", equivalent to "computer-accessible memory" in the context of the present disclosure, can refer to any type of temporary or more enduring data storage workspace used for storing and operating upon image data and accessible to a computer system, including a database. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It is understood that computer program products of the present disclosure may make use of various image manipulation algorithms and processes that are well known. It will be further understood that exemplary computer program product embodiments of the present disclosure may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present disclosure, are not specifically shown or described herein and may be selected from such algorithms, systems, hardware, components and elements known in the art.

Exemplary embodiments according to the application can include various features described herein, individually or in combination.

While the invention has been illustrated with respect to one or more implementations, alterations and/or modifications can be made to the illustrated examples without departing from the spirit and scope of the appended claims. In addition, while a particular feature of the invention can have been disclosed with respect to one of several implementations, such feature can be combined with one or more other features of the other implementations as can be desired and advantageous for any given or particular function. Other embodiments of the invention will be apparent to those skilled in the art from consideration of the specification and practice of the invention disclosed herein. It is intended that the specification and examples be considered as exemplary only, with a true scope and spirit of the invention being indicated by the following claims, and all changes that come within the meaning and range of equivalents thereof are intended to be embraced therein.

What is claimed is:

1. A probe member intended to be used for 2D and/or 3D imaging a soft tissue in an intra oral cavity, comprising:
   an acoustic window intended to face the soft tissue to be imaged;
   an ultrasound transducer system configured for:
      emitting an ultrasound signal, in the form of a beam having an ultrasound beam axis, through the acoustic window; and
      receiving a corresponding ultrasound return signal through the acoustic window;
   a beam forming and scanning assembly configured for driving the ultrasound beam axis across at least one scanning axis different from the ultrasound beam axis so as to scan the emitted beam through the acoustic window
   the ultrasound transducer system operating at a center frequency in the range of 10 MHz to 100 MHz;
   a conformable material portion external to and surrounding the acoustic window; and
   coupling medium circulation circuitry configured for guiding a flow of coupling medium between the acoustic window and the external conformable material portion;
   wherein the conformable material portion conforms upon contact to the soft tissue to be imaged and the coupling medium acoustically couples the acoustic window to the conformable material portion.

2. The probe member according to claim 1, wherein the ultrasound transducer system is further configured for generating a focused ultrasound beam.

3. The probe member according to claim 2, wherein the ultrasound transducer system comprises at least one transducer located at a distance from the acoustic window.

4. The probe member according to claim 1, wherein the ultrasound transducer system comprises at least one transducer.

5. The probe member according to claim 4, wherein the at least one transducer is of the following type: mono-element transducer, multi-element annular transducer, 1D array transducer, or 2D array transducer.

6. The probe member according to claim 4, wherein
the transducer focal distance is less than or equal to 20 mm, or
the transducer depth of field is greater than or equal to 2 mm.

7. The probe member according to claim 4, wherein the at least one transducer is associated with an acoustic reflector.

8. The probe member according to claim 4, wherein the beam forming and scanning assembly is configured for oscillating the at least one transducer along one or two scanning axes.

9. The probe member according to claim 1, wherein the acoustic window is closed with an acoustic membrane.

10. The probe member according to claim 1, wherein the beam forming and scanning assembly is configured for driving mechanically or electronically the ultrasound beam axis across the at least one scanning axis.

11. The probe member according to claim 1, wherein the assembly comprises an acoustic reflector disposed between the ultrasound transducer system and the acoustic window and an actuator coupled to the acoustic reflector and configured to drive an oscillation motion of the reflector.

12. The probe member according to claim 1, further comprising a removable probe head shell that includes the acoustic window, the conformable material portion, and an outlet or nozzle portion fluidly coupled to the coupling medium circulation circuitry for guiding the flow of coupling medium between the acoustic window and the external conformable material portion.

13. A probe intended to be used for 2D and/or 3D imaging a soft tissue in an intra oral cavity, comprising a probe member according to claim 1.

14. The probe according to claim 13, wherein the probe further comprises a probe body and the probe member is a probe head.

15. The probe according to claim 14, wherein the probe comprises a rapid connect/disconnect connector that comprises electrical terminals and coupling medium inlet/outlet.

16. The probe according to claim 15, wherein the rapid connect/disconnect connector is suitable for connecting/disconnecting the probe body to a hose or the probe body to the probe head.

17. The probe according to claim 14, wherein the probe head comprises a probe head cover covering a probe head part that is connected to the probe body and a removable probe head shell that comprises the acoustic window, the acoustic window being a closed acoustic window.

18. A method for operating a probe member according to claim 1 for 2D and/or 3D imaging a soft tissue in an intra oral cavity, comprising:
emitting the ultrasound signal in the form of the beam having an ultrasound beam axis;
driving the ultrasound beam across the at least one scanning axis different from the ultrasound beam axis so as to scan the emitted beam through the acoustic window; and
receiving a corresponding ultrasound return signal through the acoustic window.

* * * * *